(12) United States Patent
Kanda et al.

(10) Patent No.: US 12,162,296 B2
(45) Date of Patent: *Dec. 10, 2024

(54) NON-TRANSITORY COMPUTER READABLE STORAGE MEDIUM STORING SET OF PROGRAM INSTRUCTIONS FOR CREATING A PLURALITY OF PRINT LABELS WITH PRINTING DEVICE

(71) Applicant: BROTHER KOGYO KABUSHIKI KAISHA, Nagoya (JP)

(72) Inventors: Ryuichi Kanda, Nagoya (JP);
Tomoyasu Fukui, Inuyama (JP);
Koichi Kondo, Inuyama (JP);
Hiromichi Nampo, Kiyosu (JP);
Michihiko Furuhashi, Kiyosu (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/449,316

(22) Filed: Aug. 14, 2023

(65) Prior Publication Data
US 2023/0398794 A1  Dec. 14, 2023

Related U.S. Application Data

(63) Continuation of application No. 17/388,917, filed on Jul. 29, 2021, now Pat. No. 11,760,108.

(30) Foreign Application Priority Data

Jul. 30, 2020 (JP) ................. 2020-129394

(51) Int. Cl.
*B41J 3/407* (2006.01)
*B41J 3/46* (2006.01)
(Continued)

(52) U.S. Cl.
CPC ............. *B41J 3/4075* (2013.01); *B41J 3/46* (2013.01); *B41J 11/008* (2013.01); *B41J 11/009* (2013.01); *B41J 11/703* (2013.01)

(58) Field of Classification Search
CPC . B41J 3/4075; B41J 3/46; B41J 11/703; B41J 29/393; B41J 11/008; B41J 11/009;
(Continued)

(56) References Cited

U.S. PATENT DOCUMENTS 7,252,442 B2   8/2007 Okochi
10,543,703 B2  1/2020 Nishihara
(Continued)

FOREIGN PATENT DOCUMENTS

JP   2003-001897 A   1/2003

*Primary Examiner* — Kristal Feggins
(74) *Attorney, Agent, or Firm* — KENEALY VAIDYA LLP

(57) ABSTRACT

A non-transitory computer-readable storage medium stores a set of program instructions including: (a) generating; (b) generating; (c) setting; and (d) displaying. The (a) generating generates a plurality of sets of print data corresponding to respective ones of a plurality of print labels used in an overlaid state. The (b) generating generates a plurality of sets of medium type information for respective ones of the plurality of print labels. Each medium type information indicates a type of a printing medium used for creating a corresponding print label. The (c) setting sets a layering order for the plurality of print labels. The (d) displaying displays a list of the plurality of sets of medium type information on a display. The plurality of sets of medium type information is arranged in the layering order for the plurality of print labels corresponding to respective ones of the plurality of sets of medium type information.

19 Claims, 17 Drawing Sheets

(51) Int. Cl.
*B41J 11/00* (2006.01)
*B41J 11/70* (2006.01)

(58) Field of Classification Search
CPC ....... B41J 11/003; B41J 11/0035; B41J 11/42; B41J 11/485; B41J 13/00; B41J 13/0009; B41J 15/00; B41J 15/046; B41J 15/04; B41J 15/044; B41M 5/00; G06F 3/1241; G06F 2206/1514; G06F 3/1253; G06F 3/1205
See application file for complete search history.

(56) References Cited

U.S. PATENT DOCUMENTS

| | | | |
|---|---|---|---|
| 11,760,108 B2 * | 9/2023 | Kanda | G06F 3/1241 347/218 |
| 2002/0197090 A1 | 12/2002 | Akaiwa | |
| 2007/0283249 A1 | 12/2007 | Nose | |
| 2016/0288531 A1 | 10/2016 | Block | |

* cited by examiner

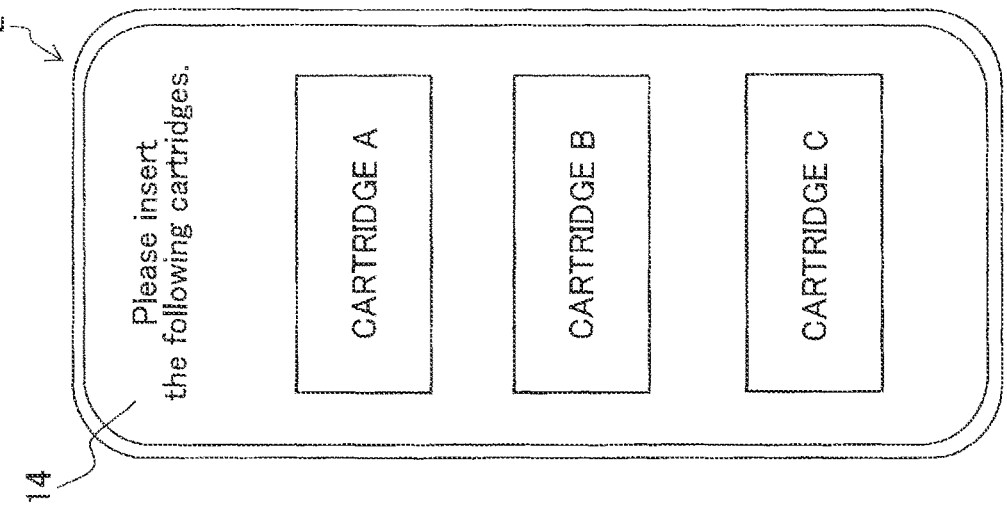
FIG. 6A
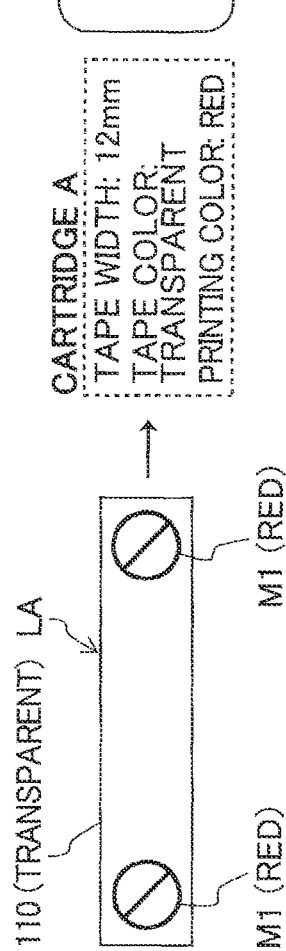
FIG. 6B
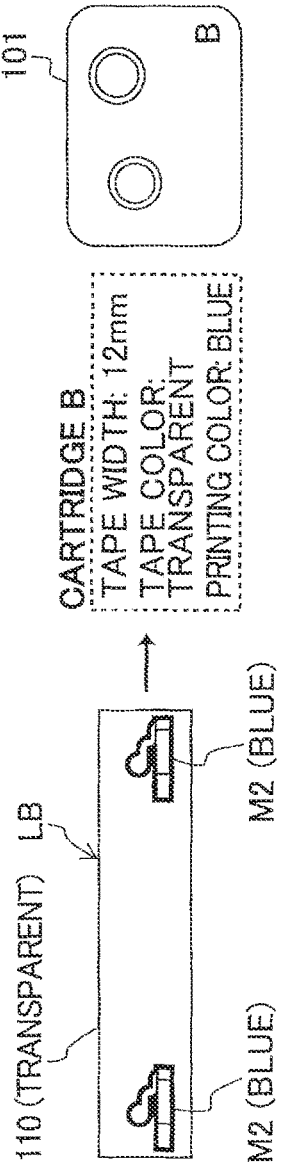
FIG. 6C
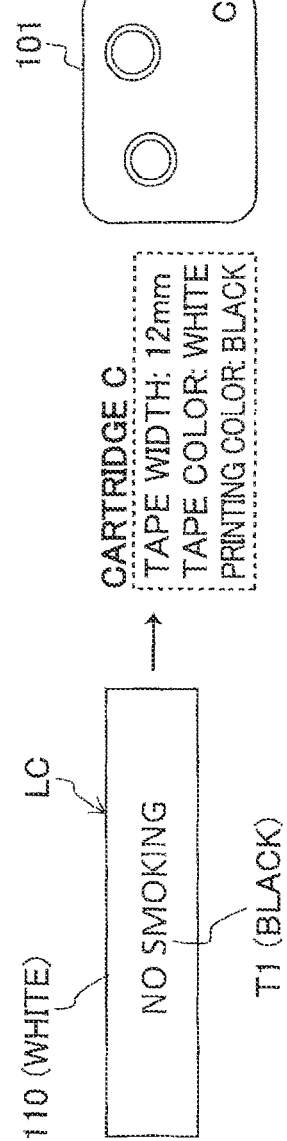

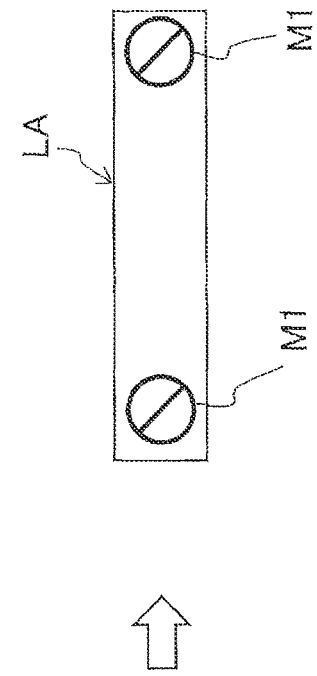
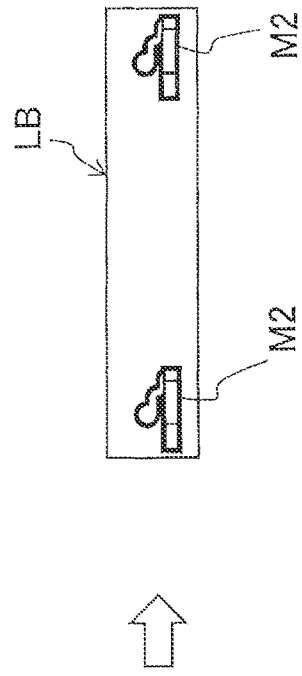
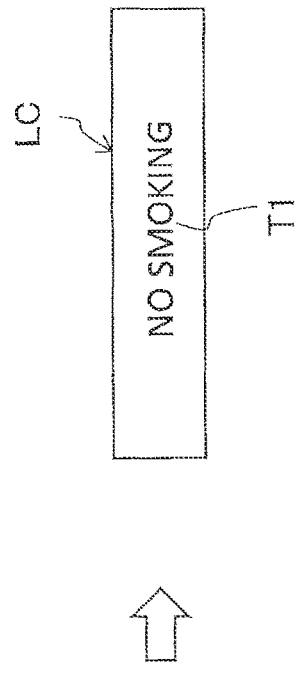
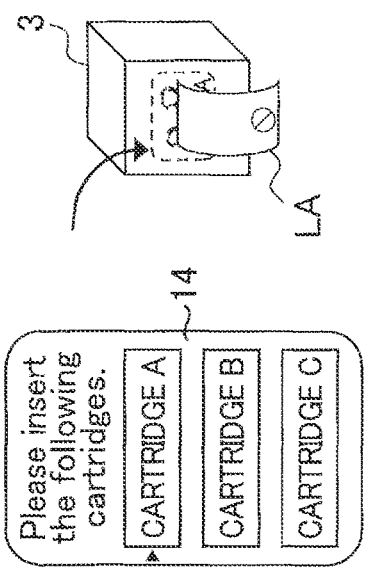
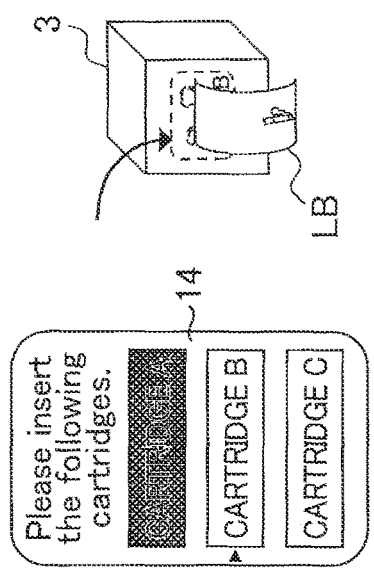
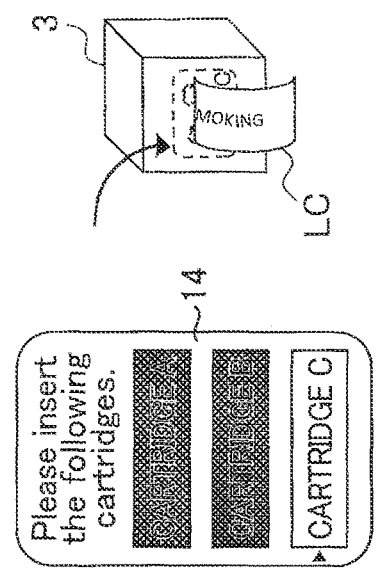
FIG. 7A  FIG. 7B  FIG. 7C

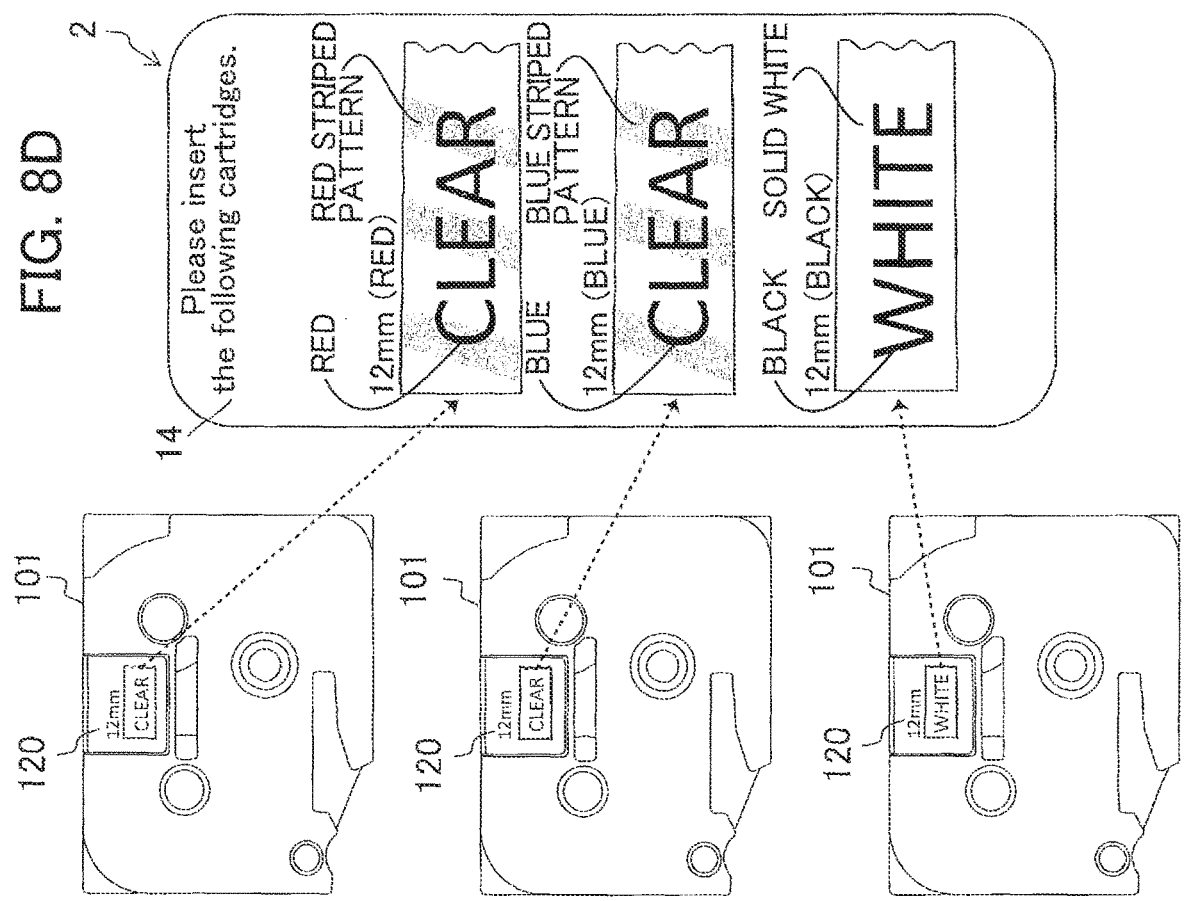
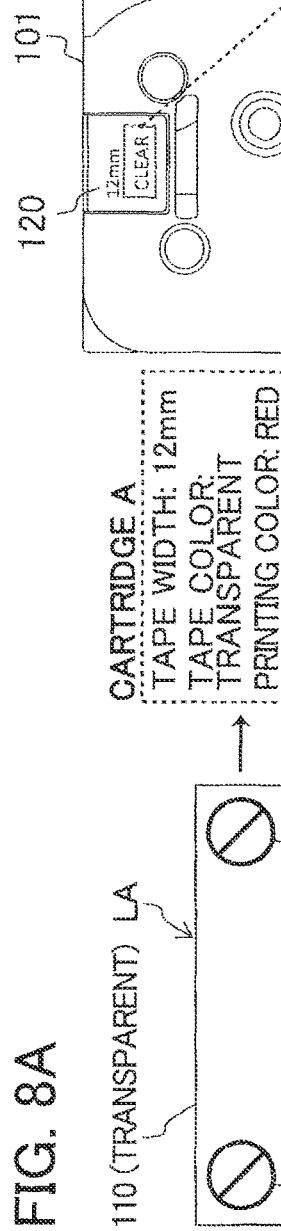

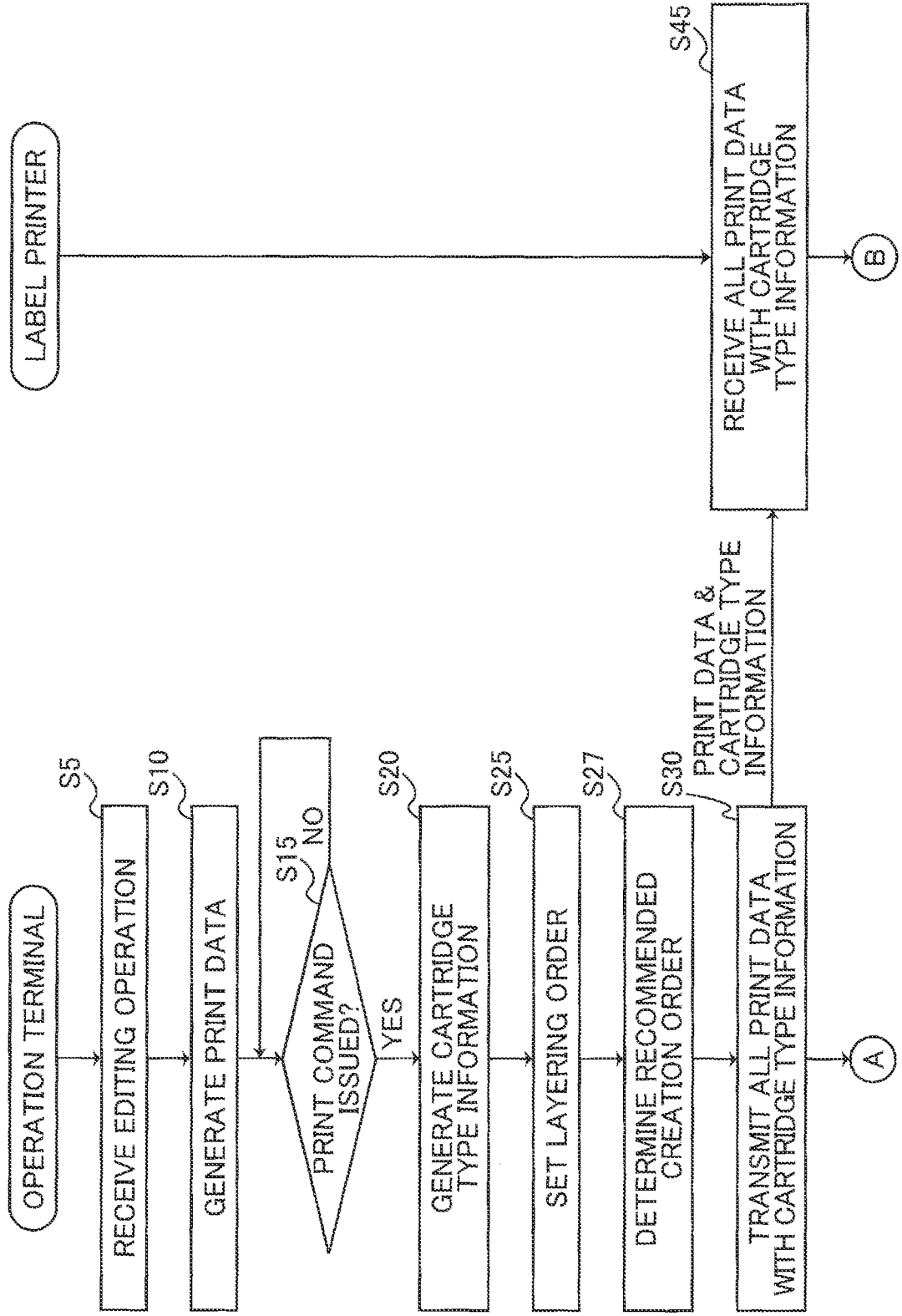

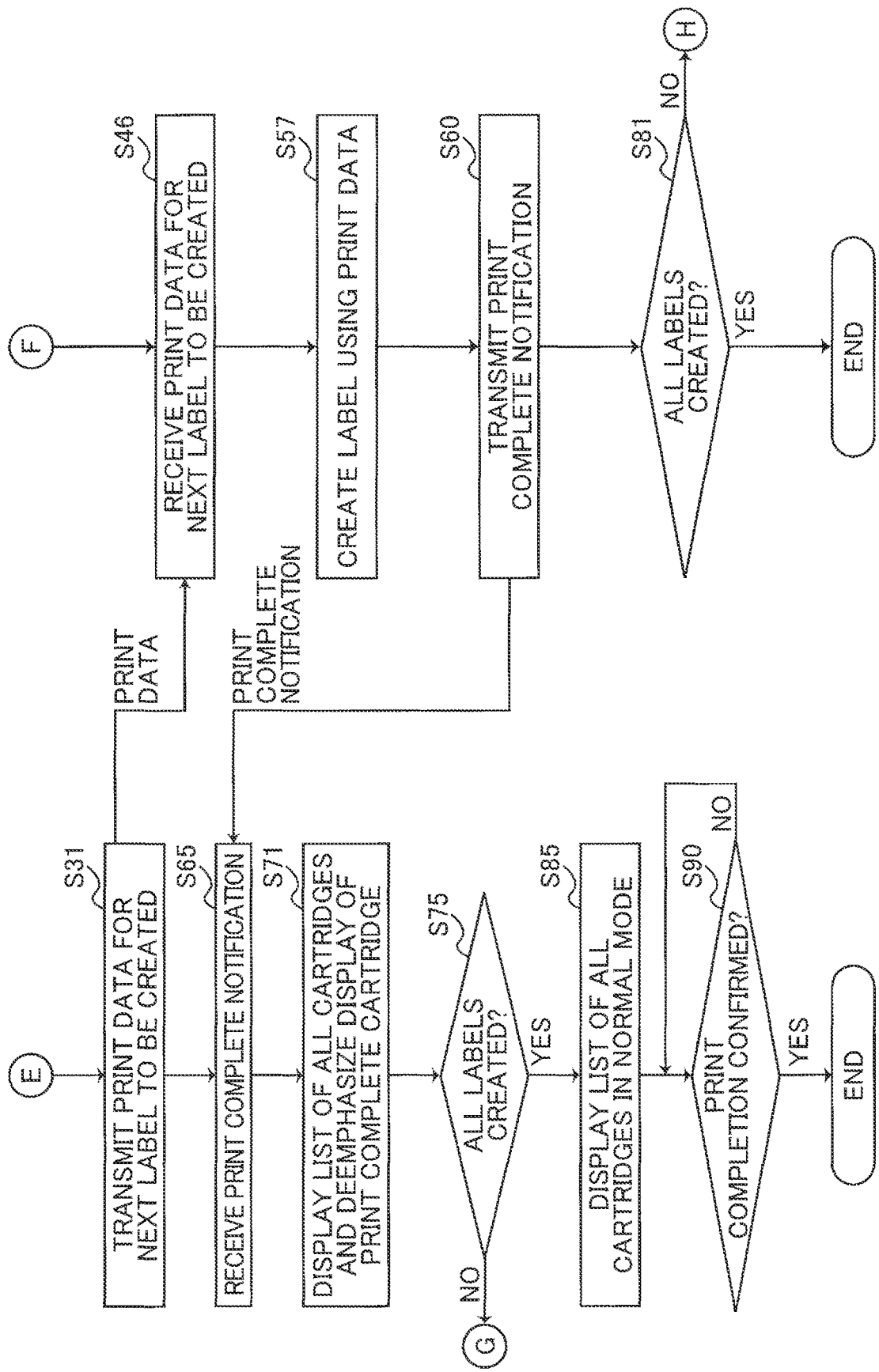

NON-TRANSITORY COMPUTER READABLE STORAGE MEDIUM STORING SET OF PROGRAM INSTRUCTIONS FOR CREATING A PLURALITY OF PRINT LABELS WITH PRINTING DEVICE

REFERENCE TO RELATED APPLICATIONS

This application is a continuation of U.S. patent application Ser. No. 17/388,917, filed Jul. 29, 2021, which claims priority from Japanese Patent Application No. 2020-129394 filed Jul. 30, 2020. The entire contents of the aforementioned applications are incorporated herein by reference.

BACKGROUND ART

Technical Field

The present disclosure relates to a non-transitory computer-readable storage medium storing a set of program instructions for creating a plurality of print labels with a printing device, a printing device, and a method for creating a plurality of print labels with a printing device.

Background

A technology for creating a plurality of print labels that are overlaid on each other is well known in the art. In this technology, a print label is created by printing each of mutually different types of printing tape.

DESCRIPTION

Summary

When creating a plurality of print labels designed to be overlaid on each other, as in the conventional technology described above, tape cartridges accommodating printing tape are mounted in the printing device one at a time, and the printing tape in each of the plurality of tape cartridges is printed sequentially while exchanging the tape cartridges in sequence in between prints. Accordingly, in order to create these print labels, the user must prepare all of the corresponding tape cartridges in advance. However, understanding the order in which each of the plurality of tape cartridges must be inserted into the printing device can be difficult.

In view of the foregoing, it is an object of the present disclosure to provide a non-transitory computer-readable storage medium storing a set of computer readable instructions, a printing device, and a printing method that can facilitate the user in visually identifying the order in which each medium accommodation body must be mounted in the printing device to create a plurality of print labels for use in an overlaid state.

In order to attain the above and other objects, the present disclosure provides a non-transitory computer-readable storage medium storing a set of program instructions. The set of program instructions is installed on and executed by a controller provided in a terminal device. The terminal device is configured to communicate with a printing device. The set of program instructions includes: (a) generating; (b) generating; (c) setting; and (d) displaying. The (a) generating generates a plurality of sets of print data corresponding to respective ones of a plurality of print labels used in an overlaid state. The (b) generating generates a plurality of sets of medium type information for respective ones of the plurality of print labels. Each of the plurality of sets of medium type information indicates a type of a printing medium used for creating a corresponding one of the plurality of print labels. The (c) setting sets a layering order for the plurality of print labels. The layering order indicates an order in which the plurality of print labels is to be overlaid on each other. The (d) displaying displays a list of the plurality of sets of medium type information on a display. The plurality of sets of medium type information is arranged in the layering order set for the plurality of print labels corresponding to respective ones of the plurality of sets of medium type information.

According to another aspect, the present disclosure also provides a printing device including: a mounting portion; a printing portion; a display: and a controller. A medium accommodation body is detachably mountable in the mounting portion. The medium accommodation body accommodates therein and is capable of supplying a printing medium. The printing portion is configured to perform desired printing using the printing medium supplied from the medium accommodation body. The controller is configured to perform: (a) controlling; (b) generating; (c) setting; and (d) displaying. The (a) controlling controls the printing portion to perform printing of a plurality of print labels based on respective ones of a plurality of sets of print data. The plurality of print labels is to be sequentially overlaid on each other. The (d) displaying displays a list of the plurality of sets of medium type information on the display. The plurality of sets of medium type information is arrange in the layering order set for the plurality of print labels corresponding to respective ones of the plurality of sets of medium type information.

According to still another aspect, the present disclosure also provides a method for creating a first print label and a second print label with a printing device. Each of the first print label and the second print label has a first surface on which an image is printed by the printing device and a second surface. The second print label is overlaid on the first print label with the second surface of the second print label faces the first surface of the first print label. The method includes: (a) generating; (b) generating; (c) acquiring; (d) acquiring; and (e) displaying. The (a) generating generates first print data corresponding to the first print label. The (b) generating generates second print data corresponding to the second print label. The (c) acquiring acquires first medium type information corresponding to the first print data. The first print medium type information indicates a type of a first printing medium used for creating the first print label. The (d) acquiring acquires second medium type information corresponding to the second print data. The second medium type information indicates a type of a second printing medium used for creating the second print label. The (e) displaying displays first display information related to the first medium type information and second display information related to the second medium type information on a display in an order of the second display information and the first display information.

BRIEF DESCRIPTION OF THE DRAWINGS

The particular features and advantages of the disclosure as well as other objects will become apparent from the following description taken in connection with the accompanying drawings, in which:

FIGS. 5A through 5D illustrate an example of one composite label created by overlaying three print labels, in which: FIG. 5A illustrates one print label that will form the topmost layer when the three print labels are overlaid; FIG. 5B illustrates another print label that will form the middle layer when the three print labels are overlaid; FIG. 5C illustrates another print label that will form the bottommost layer when the three print labels are overlaid; and FIG. 5D illustrates the print label in which the three print labels are overlaid;

FIGS. 6A through 6C illustrate one example of the correspondence between the print labels to be created and types of cartridges to be used;

FIG. 6D illustrates one example of display of cartridge names on a display unit of the operation terminal in accordance with a layering order of the print labels;

FIGS. 7A through 7C illustrate one example of an emphasizing process and a deemphasizing process performed on the display of the cartridge names in accordance with a recommended creation order of the print labels;

FIGS. 8A through 8C illustrate another example of the correspondence between the print labels to be created and the types of the cartridges to be used;

FIG. 8D illustrates another example of display of cartridge names on a display unit of the operation terminal in accordance with the layering order of the print labels;

FIGS. 11A and 11B are sequence charts illustrating steps in a control procedure executed cooperatively by a CPU of the operation terminal and a CPU of the label printer according to the embodiment of the present disclosure;

FIGS. 13A and 13B are sequence charts illustrating steps in a control procedure executed cooperatively by the CPU of the operation terminal and the CPU of the label printer according to another variation of the embodiment in which a type of a cartridge mounted in the label printer is acquired each time the cartridge is mounted.

DETAILED DESCRIPTION

Next, one embodiment of the present disclosure will be described while referring to the accompanying drawings.

<Overall Structure of a Printing System>

Figure 1:
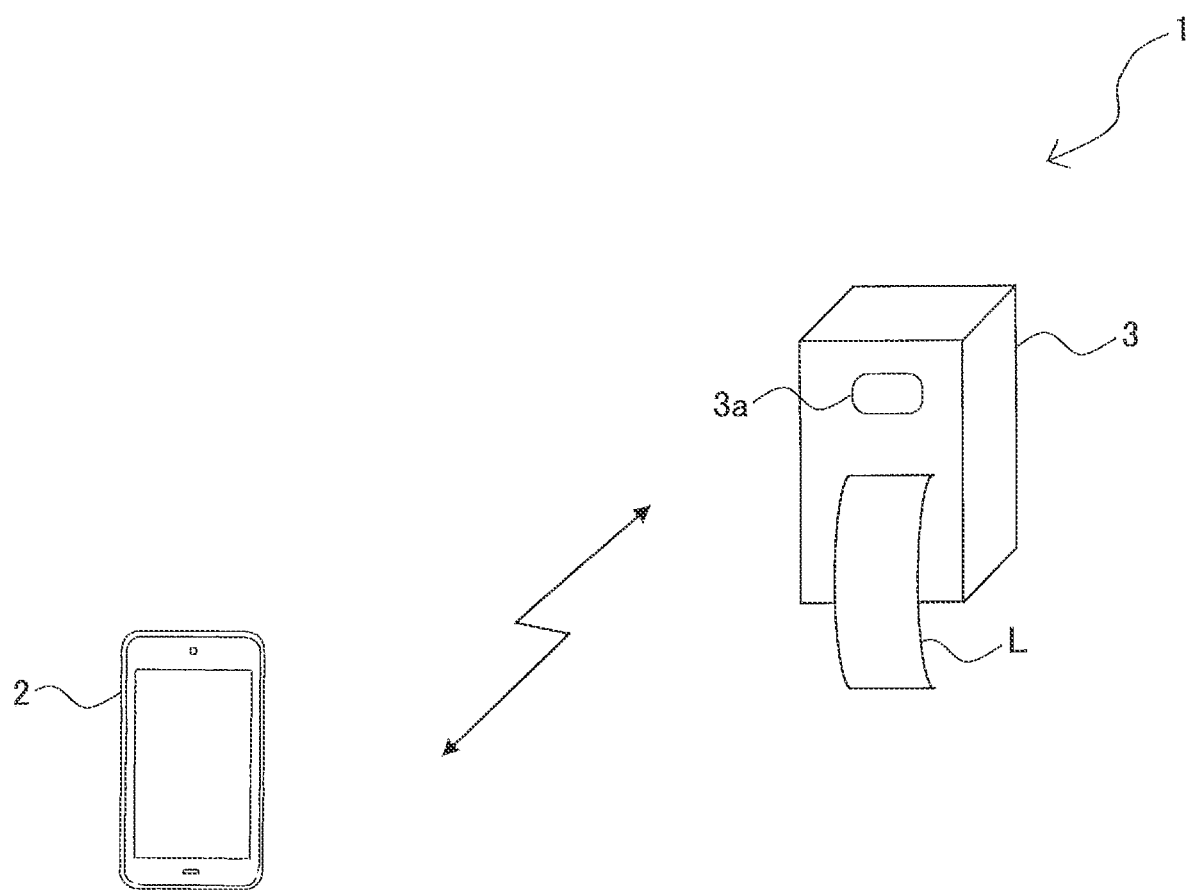
FIG. 1 illustrates an overall structure of a printing system according to one embodiment of the present disclosure.

FIG. 1 illustrates the overall structure of a printing system according to the present embodiment. In the example of FIG. 1, the printing system 1 includes an operation terminal 2 and a label printer 3. For example, the operation terminal 2 is configured of a smartphone. The label printer 3 is connected to the operation terminal 2. In this example, the label printer 3 is wirelessly connected to the operation terminal 2, and can exchange information with the operation terminal 2. As an alternative to the smartphone, the operation terminal 2 may be configured of a general-purpose personal computer or the like. The label printer 3 is configured to create print labels L in response to user operations performed on the operation terminal 2. The operation terminal is an example of the terminal device of the present disclosure, and the label printer 3 is an example of the printing device of the present disclosure.

<Operation Terminal>

Figure 2:
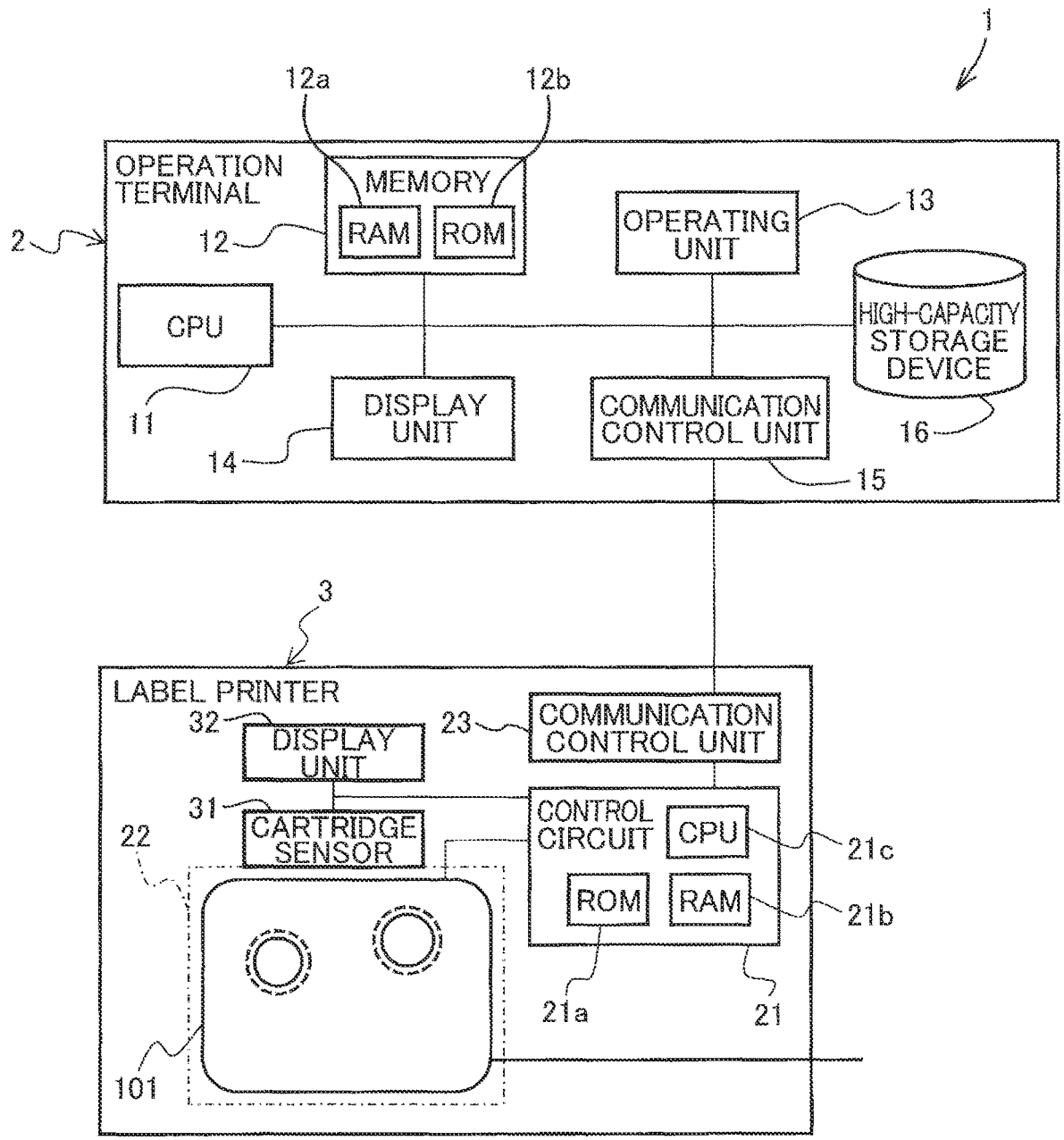
FIG. 2 is a block diagram illustrating a functional structure of the printing system including an operation terminal and a label printer according to the embodiment.

As illustrated in FIG. 2, the operation terminal 2 includes a central processing unit (CPU) 11, a memory 12, an operating unit 13, a display unit 14, a communication control unit and a high-capacity storage device 16. The memory 12 includes a random-access memory (RAM) 12a, a read-only memory (ROM) 12b, and the like, for example. The CPU 11 is an example of the controller of the terminal device of the present disclosure, and the communication control unit 15 is an example of the communication interface of the present disclosure.

The user inputs instructions and information on the operating unit 13. The display unit 14 displays various information and messages. Note that the operating unit 13 and display unit 14 may be configured as a touchscreen that possesses functions of both the operating unit 13 and display unit 14. The communication control unit 15 controls the exchange of signals (information) with the label printer 3.

The high-capacity storage device 16 stores various programs and information. The ROM 12b of the memory 12 stores a printing process program for the CPU 11 to execute the steps in the flowcharts of FIGS. 11, 12, and 13 described later. As an alternative, the printing process program may be stored in the high-capacity storage device 16. Note that the high-capacity storage device 16 is not limited to a built-in memory, but may be a suitable external memory such as a secure digital memory card (SD Memory Card).

The CPU 11 uses the temporary storage function of the RAM 12a to perform the various processes and to exchange various signals (various information) with the label printer 3 according to programs pre-stored in the ROM 12b and the high-capacity storage device 16.

<Label Printer>

As illustrated in FIG. 2, the label printer 3 includes a control circuit 21, a cartridge holder 22, a cartridge sensor 31 provided in the cartridge holder 22, a communication control unit 23, and a display unit 32. The control circuit 21 includes a ROM 21a, a RAM 21b, and a CPU 21c. A cartridge 101 is detachably mounted in the cartridge holder 22. The cartridge 101 is an example of the medium accommodation body of the present disclosure, and the cartridge holder 22 is an example of the mounting portion of the present disclosure. The CPU 21c is an example of the controller of the printing device of the present disclosure, and the display unit 32 is an example of the display of the present disclosure.

The cartridge sensor 31 is configured to detect the type of the cartridge 101 mounted in the label printer 3 (the cartridge holder 22) according to a suitable method known in the art, such as mechanical detection or optical or magnetic detection.

The label printer 3 can exchange information with the operation terminal 2 when the control circuit 21 is connected to the communication control unit 15 of the operation terminal 2 via the communication control unit 23.

<Cartridge and Cartridge Holder>

Figure 3:
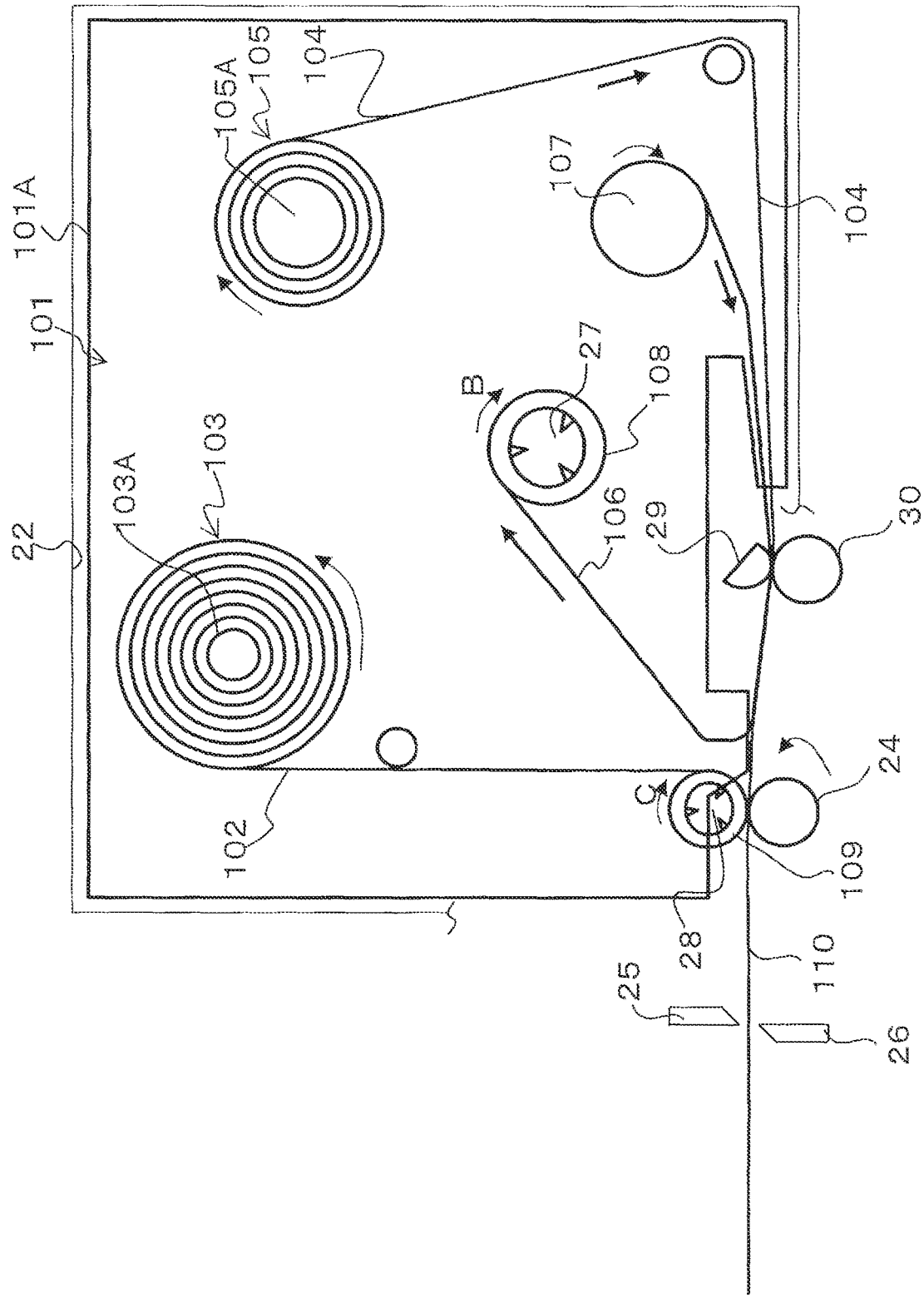
FIG. 3 illustrates a detailed structure of a cartridge and a related structure of a cartridge holder in the label printer.
Figure 4A:
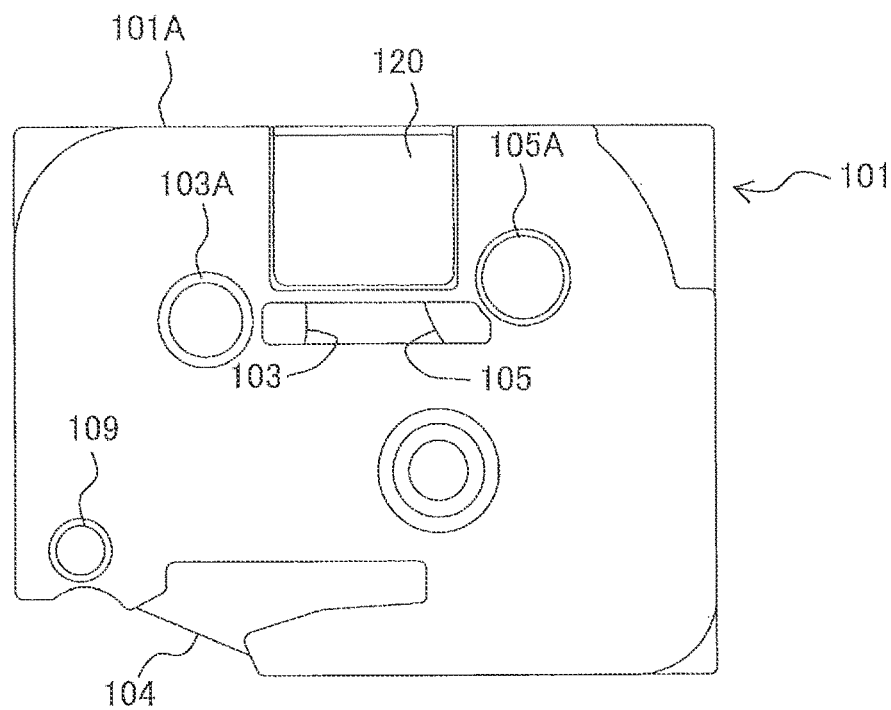
FIG. 4A illustrates a side view of a detailed exterior structure of the cartridge.
Figure 4B:
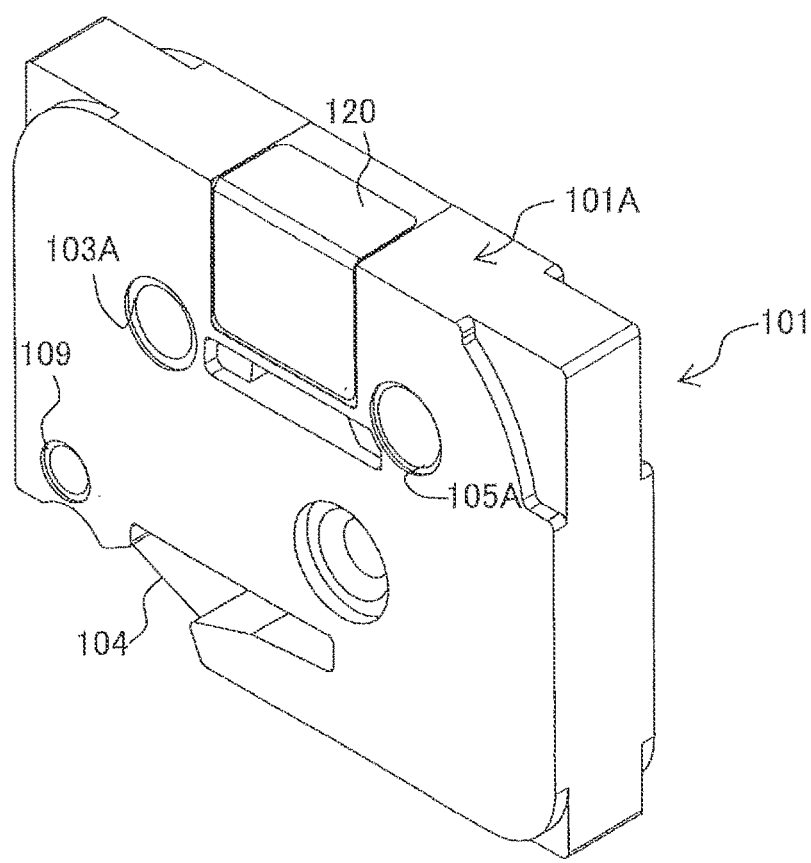
FIG. 4B illustrates a perspective view of the detailed exterior structure of the cartridge.

FIG. 3 illustrates a detailed structure of the cartridge 101 and the related structure of the cartridge holder 22. Further, FIGS. 4A and 4B illustrates a detailed exterior structure of the cartridge 101. In FIGS. 3, 4A, and 4B, the cartridge 101 has a housing 101A, a first roll 103, a second roll 105, a ribbon supply roll 107, a ribbon take-up roller 108, and a tape feed roller 109.

An information indicating part 120 is provided on the housing 101A. The information indicating part 120 is a suitable label, plate, or the like that displays information about the cartridge 101, such as cartridge type information. As illustrated in FIG. 1, a viewing window 3a is provided at an appropriate location in the housing of the label printer 3 for viewing the content displayed on the information indicating part 120 from outside the label printer 3.

The first roll 103 includes a spool 103A rotatably supported in the housing 101A, and a base tape 102 wound around the spool 103A. The base tape 102 is configured of a bonding adhesive layer, a base layer, a mounting adhesive layer, and a release layer, for example. These layers are laminated sequentially from the inward-facing side of the wound base tape 102 forming the first roll 103 toward the opposite side.

The second roll 105 includes a spool 105A rotatably supported in the housing 101A, and a transparent cover film 104 wound around the spool 105A. The cover film 104 has the same width as the base tape 102. Note that, while depicted as concentric circles in the drawings for simplification, the first roll 103 and second roll 105 are actually wound in a spiral shape.

The cover film 104 and an ink ribbon 106 to be described below are an example of the printing medium of the present disclosure. The cover film 104, base tape 102, and the like are indirectly mounted in the cartridge holder 22 (the label printer 3) by mounting the cartridge 101 in the cartridge holder 22, as described above.

The ribbon supply roll 107 pays out an ink ribbon 106. The ribbon take-up roller 108 tales up the ink ribbon 106 that has been used for printing. Note that the ink ribbon 107 is unnecessary in a case where the cover film 104 is a thermal tape that can produce a prescribed color when heated.

The tape feed roller 109 is rotatably supported near a tape discharge portion of the cartridge 101. The tape feed roller 109 bonds the base tape 102 to the cover film 104 with pressure to form a print label tape 110 while conveying the same.

A ribbon take-up roller drive shaft 27 and a tape feed roller drive shaft 28 are provided in the cartridge holder 22. The ribbon take-up roller drive shaft 27 is provided for taking up the portion of the ink ribbon 106 already used for printing. The tape feed roller drive shaft 28 is provided for conveying the print label tape 110 described above. When the drive force of a conveying roller motor (not illustrated) is transmitted to the ribbon take-up roller drive shaft 27 and tape feed roller drive shaft 28, the ribbon take-up roller 108 and tape feed roller 109 are driven to rotate in conjunction with each other.

The cartridge holder 22 is also provided with a print head 29 that prints desired content on the cover film 104 as the cover film 104 is conveyed. The print head 29 is an example of the printing portion of the present disclosure.

A fixed blade 25 and a movable blade 26 are provided along the conveying path of the print label tape 110 on the downstream side of the tape feed roller 109 and a pressure roller 24. The movable blade 26 is configured to cut through the print label tape 110 in the thickness direction in cooperation with the fixed blade 25.

<Outline of Label Printer Operations>

In the label printer 3 having the above construction, when the cartridge 101 is mounted in the cartridge holder 22, the cover film 104 and ink ribbon 106 become interposed between the print head 29 and a platen roller 30 opposing the print head 29. At the same time, the base tape 102 and cover film 104 become interposed between the tape feed roller 109 and the pressure roller 24 opposing the tape feed roller 109.

When the ribbon take-up roller 108 and tape feed roller 109 are driven to rotate in synchronization along the directions indicated by the respective arrows B and C in FIG. 3, the pressure roller 24 and platen roller 30 rotate, whereupon the base tape 102 is paid out from the first roll 103 and supplied to the tape feed roller 109 and the cover film 104 is paid out from the second roll 105. The print head 29 prints on the cover film 104 by a plurality of heating elements in the print head 29 being energized by a print driving circuit (not illustrated). The ribbon take-up roller drive shaft 27 drives the ribbon take-up roller 108 to take up the ink ribbon 106 that has been used for printing on the cover film 104.

The base tape 102 and the printed portion of the cover film 104 are integrally bonded between the tape feed roller 109 and the pressure roller 24 to form the print label tape 110, and the print label tape 110 is conveyed out of the cartridge 101. The portion of the print label tape 110 that has been conveyed out of the cartridge 101 is cut off through the cooperative operations of the fixed blade 25 and movable blade 26, producing a print label L.

<Composite Labels>

In the present embodiment, a plurality of uniquely different print labels L individually created on the label printer 3 is overlaid in the thickness direction and bonded together. In this example, three print labels L are created on the label printer 3. In their bonded state, the labels are then fixed to a desired object. More specifically, different types of cartridges 101 are mounted in the cartridge holder 22 and sequentially exchanged in the present embodiment so that the label printer 3 creates a plurality of uniquely different print labels L to be overlaid on each other, as described above.

At this time, it is possible to create print labels L of different tape colors by selectively using a plurality of types of cartridges 101 accommodating print label tapes 110 of different colors, for example. Similarly, print labels L can be created by varying the printing color used to print the print objects by selectively using a plurality of types of cartridges 101 provided with different colors of ink ribbons 106. Note that at least one of the cover film 104 and base tape 102 used for creating the labels may be common if the ink ribbon 106 is varied, and at least one of the cover film 104 and ink ribbon 106 used for creating the labels may be common if the base tape 102 is varied. These cases are equivalent to the use of mutually different types of printing media. Examples of print labels created according to the method described above will be described next with reference to FIGS. 5A through 5C.

Figure 5A:
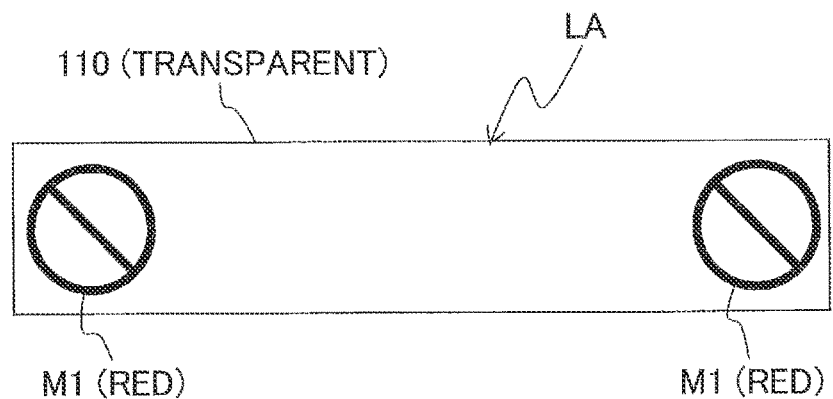

FIG. 5A illustrates one print label LA that will form the topmost layer when the three print labels are overlaid. In this example, a prohibited mark M1 is formed on each longitudinal end of the print label LA configured of a transparent print label tape 110. Each prohibited mark M1 is red in color and comprises a circle with a diagonal line through the middle.

Figure 5B:
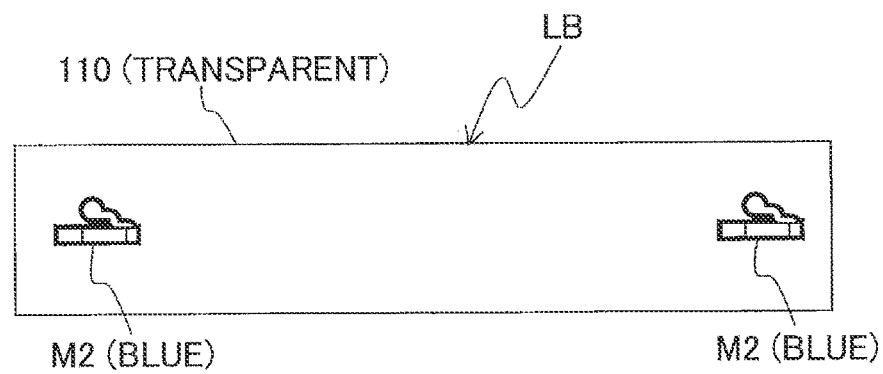

FIG. 5B illustrates another print label LB that will form the middle layer when the three print labels are overlaid. In this example, a cigarette icon M2 is formed on each longitudinal end of the print label LB configured of a transparent print label tape 110. Each cigarette icon M2 is blue in color and depicts a smoking cigarette.

Figure 5C:
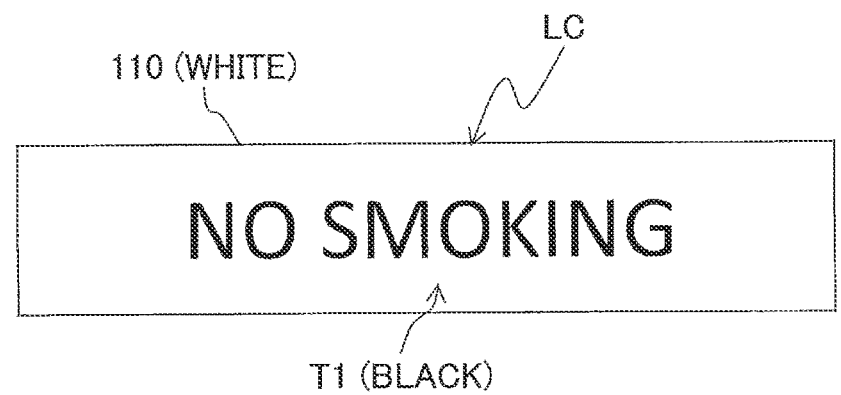

FIG. 5C illustrates another print label LC that will form the bottommost layer when the three print labels are overlaid. In this example, text T1 is formed along the longitudinal center region of the print label LC configured of a white print label tape 110. The text T1 is "NO SMOKING" formed in black.

Figure 5D:
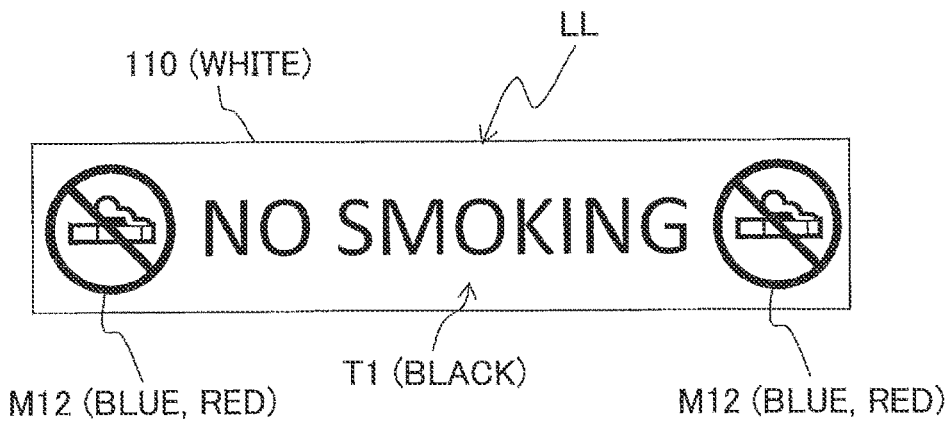

As described above, the print label tape 110 in this example is transparent for both the print label LA in FIG. 5A and the print label LB in FIG. 5B. Accordingly, a print label LL illustrated in FIG. 5D is created by sequentially overlaying the print label LA as the top layer, the print label LB as the middle layer, and the print label LC as the bottom layer, as described above. In the following description, the print label LL will be called the "composite label LL." Further, the print label LA will be called the "top label LA," the print label LB will be called the "middle label LB," and the print label LC will be called the "bottom label LC."

As a result of overlaying the three print labels, the red prohibited marks M1 and the blue cigarette icons M2 on both longitudinal ends of the tape portion, which is white in appearance, are overlapped to configure composite "no smoking" symbols M12 in the composite label LL. Further, the black text T1 is arranged between the two "no smoking" symbols M12. For convenience in the following description, the prohibited marks M1, cigarette icons M2, and "no smoking" symbols M12 will simply be called "marks M," and these marks M and the text T1 will be called "print objects."

Note that the top label LA, middle label LB, and bottom label LC in this example all have the same width and the same length. Thus, the composite label LL illustrated in FIG. 5D is created by overlaying the top label LA illustrated in FIG. 5A, the middle label LB illustrated in FIG. 5B, and the bottom label LC illustrated in FIG. 5C so that they are precisely aligned with each other.

<Feature of the Embodiment>

One feature of the present embodiment having the above configuration is the display mode used on the operation terminal 2 when a plurality of uniquely different print labels L, such as those described above, are being created on the label printer 3. A case in which the top label LA, middle label LB, and bottom label LC described above are created on the label printer 3 will be described below in detail.

As described above, the top label LA, middle label LB, and bottom label LC have various different printing contents, printing colors, and tape colors. Therefore, three different types of cartridges 101 are used in the label printer 3 for creating each of the top label LA, middle label LB, and bottom label LC. These three types of cartridges 101 are sequentially mounted in the cartridge holder 22.

As illustrated in the example of FIG. 6A, a cartridge 101 provided with a transparent print label tape 110 having a tape width of 12 mm, and a red ink ribbon 106 must be used when creating the top label LA provided with the red prohibited marks M1. For convenience, this cartridge 101 will simply be called "cartridge A" in the following description. This notation is similarly used in the drawings.

As illustrated in FIG. 6B, a cartridge 101 provided with a transparent print label tape 110 having a tape width of 12 mm, and a blue ink ribbon 106 must be used when creating the middle label LB provided with the blue cigarette icons M2. For convenience, this cartridge 101 will simply be called "cartridge B" in the following description. This notation is similarly used in the drawings.

As illustrated in FIG. 6C, a cartridge 101 provided with a white print label tape 110 having a tape width of 12 mm, and a black ink ribbon 106 must be used when creating the bottom label LC provided with the black text T1. For convenience, this cartridge 101 will simply be called "cartridge C" in the following description. This notation is similarly used in the drawings.

Therefore, in order to create the composite label LL, the user must prepare these three corresponding cartridges A, B, and C in advance and must sequentially mount the cartridges to create the top label LA, middle label LB, and bottom label LC. However, when creating these labels, it can be difficult to determine the order in which each of the cartridges A, B, and C need to be mounted in the cartridge holder 22 of the label printer 3.

<Sample Display of a Cartridge List>

In the present embodiment, the cartridges A, B, and C used for creating the labels LA through LC are displayed in a list on the display unit 14 of the operation terminal 2. At this time, "cartridge A" corresponding to the top label LA, "cartridge B" corresponding to the middle label LB, and "cartridge C" corresponding to the bottom label LC are displayed in an order corresponding to the layering order of the labels LA through LC, as illustrated in FIG. 6D.

In this example, a recommended order for creating the labels LA through LC is preset, and an emphasizing process to emphasize the display of each cartridge A, B, and C individually is performed according to this preset temporal creation order in order to facilitate the user in determining which cartridge to mount in the label printer 3. In the example illustrated in FIGS. 7A through 7C, the recommended creation order is top label LA→middle label LB→bottom label LC. However, the opposite order, bottom label LC→middle label LB→top label LA, may be recommended instead. In any case, the recommended creation order for the labels LA through LC should proceed continuously from one side to the other side in the layering direction in correspondence with the layering order for the labels LA through LC.

More specifically, the message "Please insert the following cartridges" is first displayed on the display unit 14, and the emphasizing process is performed to differentiate the display "CARTRIDGE A" from the other displays "CARTRIDGE B" and "CARTRIDGE C," as illustrated in FIG. 7A. In this example, the emphasizing process involves adding a solid black triangle mark to the display at a position immediately to the left of the cartridge name "CARTRIDGE A." In this way, the user can recognize that the cartridge A must be initially mounted in the cartridge holder 22 for creating the initial top label LA. Accordingly, the user simply mounts the cartridge A in the cartridge holder 22 to create the top label LA.

After creation of the top label LA has been completed as described above, a deemphasizing process is performed on the display unit 14 to differentiate the display "CARTRIDGE A" corresponding to the top label LA from the other displays "CARTRIDGE B" and "CARTRIDGE C," as illustrated in FIG. 7B. In this example of the deemphasizing process, the cartridge name "CARTRDIGE A" is grayed out so that the cartridge name is unrecognizable or difficult to see. At the same time, the emphasizing process is performed for adding the black triangle mark adjacent to "CARTRIDGE B," which is needed next for creating the middle label LB. Thus, the user simply mounts the cartridge B second in the cartridge holder 22 of the label printer 3 to create the middle label LB, as indicated in the drawing.

After creation of the middle label LB is complete, the deemphasizing process is performed on the display unit 14 for the corresponding display "CARTRIDGE B," as illustrated in FIG. 7C. In this example, "CARTRIDGE B" is grayed out in addition to "CARTRIDGE A." At the same time, the emphasizing process is performed to add the black triangle mark next to "CARTRIDGE C" on the display unit 14, as illustrated in FIG. 7C. Thus, the user can simply mount the cartridge C third in the cartridge holder 22 of the label printer 3 to create the bottom label LC, as shown in the drawings.

<Another Sample Display of a Cartridge List>

Another example for displaying the list of the cartridges A, B, and C described above will be described with reference to FIGS. 8A through 8C and FIGS. 9A through 9C. In this example, a display design similar to the displayed content on the information indicating parts 120 of the cartridges A, B, and C is used for displaying the list of the cartridges A, B, and C needed for creating the labels LA through LC illustrated in FIGS. 8A through 8C.

For example, the text "12 mm" and the text "CLEAR" are displayed in red in the information indicating part 120 of the cartridge A illustrated in FIG. 8A in accordance with the tape width of 12 mm, the transparent print label tape 110, and the red ink ribbon 106. Further, an icon representing the tape is displayed in a red striped pattern as the background of the text "CLEAR." For convenience, this icon will simply be referred to as the "tape icon" below.

Similarly, the text "12 mm" and the text "CLEAR" are displayed in blue in the information indicating part 120 of the cartridge B illustrated in FIG. 8B in accordance with the tape width of 12 mm, the transparent print label tape 110, and the blue ink ribbon 106. Additionally, a tape icon with a blue striped pattern is displayed as the background of the text "CLEAR." Similarly, the text "12 mm" and the text "WHITE" are displayed in black in the information indicating part 120 of the cartridge C illustrated in FIG. 8C in accordance with the tape width of 12 mm, the white print label tape 110, and the black ink ribbon 106. Additionally, a tape icon in solid white is displayed as the background of the text "WHITE."

As illustrated in FIG. 8D, which corresponds to FIG. 6D described above, text and icons for the cartridges A through C are displayed on the display unit 14 of the operation terminal 2 in an order corresponding to the layering order of the labels LA through LC. In this example, text and icons equivalent to the displayed content in the information indicating parts 120 are displayed using the same colors in the above example.

Specifically, the text "CLEAR" is displayed in red in the upper region of the display unit 14 with a red striped tape icon in the background, and the text "12 mm" is displayed in red directly above the tape icon. In the center region of the display unit 14, the text "CLEAR" is displayed in blue with a blue striped tape icon in the background, and the text "12 mm" is displayed in blue directly above the tape icon. In the lower region of the display unit 14, the text "WHITE" is displayed in black with a solid white tape icon in the background, and the text "12 mm" is displayed in black directly above the tape icon.

As in the description referring to FIGS. 7A through 7C, the emphasizing process and deemphasizing process are also performed in this example according to the creation order: top label LA→middle label LB→bottom label LC. However, rather than displaying a triangle mark next to the cartridge name, the emphasizing process in this example involves flashing the tape icon. Further, rather than graying out the cartridge name, the deemphasizing process in this example involves removing, i.e., deleting, the tape icon.

Figures 9A, 9B, 9C:
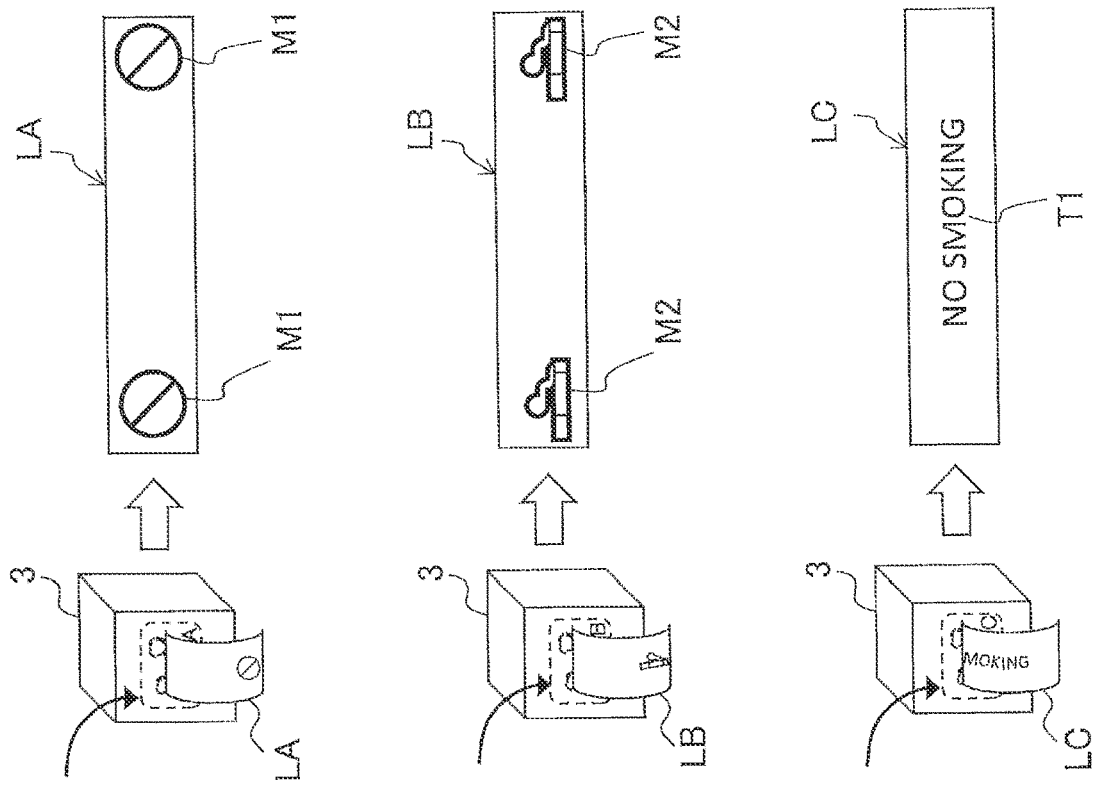
FIGS. 9A through 9C illustrate another example of the emphasizing process and the deemphasizing process performed on the display of the cartridge names in accordance with the recommended creation order of the print labels.

Hence, as illustrated in FIG. 9A, which corresponds to FIG. 7A described above, first the red striped tape icon accompanying the text "CLEAR" that corresponds to the cartridge A is highlighted on the display unit 14 to differentiate the tape icon for the cartridge A from the tape icons for the cartridge B and the cartridge C. In this example, the tape icon corresponding to the cartridge A is flashed to highlight the icon. Thus, the user simply mounts the cartridge A initially in the cartridge holder 22 of the label printer 3 to create the top label LA, as illustrated in the drawing. Moreover, since the information indicating part 120 on the cartridge A displays a design similar to the flashing tape icon, the user can easily find the cartridge A visually, making this method highly convenient.

After creation of the top label LA is completed as described above, the deemphasizing process is performed to delete the display of the corresponding "CARTRIDGE A" so that the display no longer appears on the display unit 14, as illustrated in FIG. 9B corresponding to FIG. 7B. At the same time, the CPU 11 highlights, i.e., flashes, the blue striped tape icon included with the text "CLEAR" for the cartridge B needed next to create the middle label LB in order to differentiate the tape icon for the cartridge B from the tape icon for the cartridge C. Thus, the user simply mounts the cartridge B second in the cartridge holder 22 to create the middle label LB. Moreover, the user can easily find the cartridge B at this time.

Once creation of the middle label LB is complete, "CARTRIDGE B" is eliminated from the display unit 14 in addition to "CARTRIDGE A," as illustrated in FIG. 9C corresponding to FIG. 7C. At the same time, the solid white tape icon included with the text "WHITE" for the cartridge C used to create the bottom label LC next is flashed on the display. Thus, the user simply mounts the cartridge C third in the cartridge holder 22 to create the bottom label LC. Moreover, the user can easily find the cartridge C visually.

Figure 10:
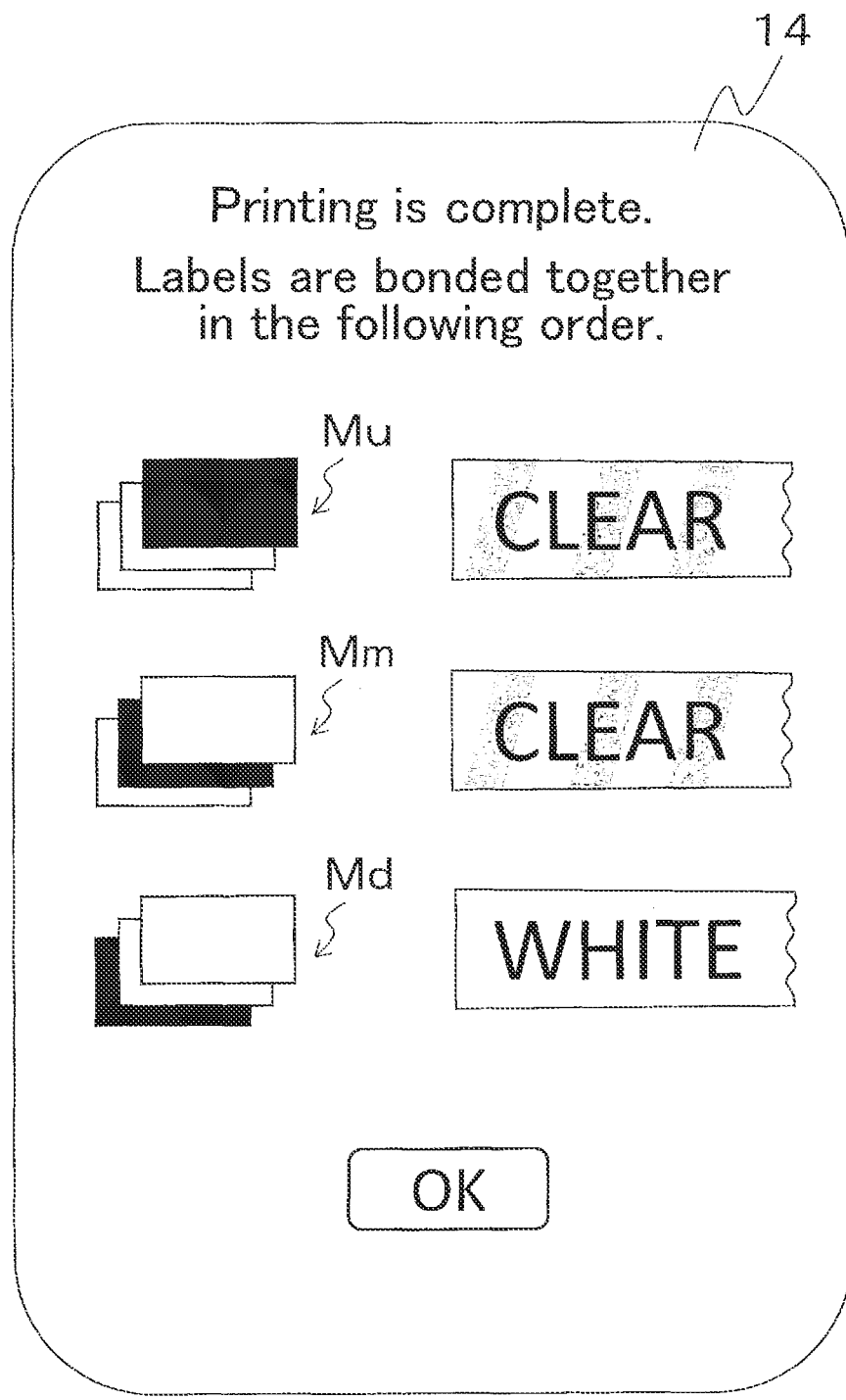
FIG. 10 illustrates an example of instructions displayed on the display unit of the operation terminal to indicate the layering order of the print labels.

After the labels LA, LB, and LC have been created in the order described above, instructions are displayed on the display unit 14 to indicate the layering order of the labels, i.e., the order in which the labels should be overlaid, as illustrated in FIG. 10.

That is, a top layer mark Mu is displayed to the left of the red striped tape icon included with the top "CLEAR" text representing the cartridge A, as illustrated in FIG. 10. The top layer mark Mu indicates that this label serves as the topmost layer in the three-layered structure.

Similarly, a middle layer mark Mm is displayed to the left of the blue striped tape icon included with the middle "CLEAR" text representing the cartridge B. The middle layer mark Mm indicates that this label serves as the middle layer in the three-layered structure.

A bottom layer mark Md is displayed to the left of the solid white tape icon included with the bottom "WHITE" text representing the cartridge C. The bottom layer mark Md indicates that this label serves as the bottom layer in the three-layered structure.

Additionally, the message "Printing is complete. Labels are bonded together in the following order." is displayed above the layer marks Mu, Mm, and Md, and an "OK" button is provided below the layer marks Mu, Mm, and Md. The user operates the "OK" button to input confirmation. Note that the instructions indicating the layering order are not limited to the layer marks Mu, Mm, and Md described above but may be other text, symbols, numbers, graphics, or a combination of these.

<Control Procedure>

A control procedure executed cooperatively by the CPU 11 of the operation terminal 2 and the CPU 21c of the label printer 3 to implement the method described above in FIGS. 6A through 10 will be described while referring to the sequence chart in FIGS. 11A and 11B. On the operation terminal 2, the CPU 11 executes the control procedure based on a printing program according to the present embodiment. The printing program is included with the programs stored in the ROM 12b. By executing this procedure, the CPU 11 implements the following printing method according to the present embodiment. On the label printer 3, the CPU 21c executes the control procedure based on a suitable control program stored in the ROM 21a.

In S5 of FIG. 11A, the CPU 11 of the operation terminal 2 first receives editing operations via the operating unit 13 indicating printing content for all print labels L. Using the example described above, the CPU 11 receives editing operations for the top label LA, middle label LB, and bottom label LC having the above printing content. In S10 the CPU 11 generates print data corresponding to the edited content received in S5. The process of S10 is an example of the (a) generating of the present disclosure.

In S15 the CPU 11 determines whether a print command has been issued for creating the labels LA through LC. The user issues the print command by performing a prescribed operation on the operating unit 13. If a print command has been issued (S15: YES), the CPU 11 advances to S20.

Based on the print data generated in S10, in S20 the CPU 11 identifies the tape width, tape color, printing color, and the like corresponding to each of the labels LA, LB, and LC. According to the above example, the CPU 11 identifies a tape width of 12 mm, a transparent tape color, and a red printing color for the top label LA; identifies a tape width of 12 mm, a transparent tape color, and a blue printing color for the middle label LB; and identifies a tape width of 12 mm, a white tape color, and a black printing color for the bottom label LC. Next, the CPU 11 generates cartridge type information based on these identification results. The cartridge type information indicates the types of the cartridges A, B, and C required for creating each of the labels LA through LC, i.e., the types of the cartridges A, B, and C provided with print label tapes 110 suited to the labels LA through LC.

Hence, the CPU 11 generates cartridge type information indicating the cartridge A for the top label LA since the cartridge A is provided with a print label tape 110 having a 12-mm tape width and a transparent tape color, and a red ink ribbon 106. For the middle label LB, the CPU 11 generates cartridge type information indicating the cartridge B since the cartridge B is provided with a print label tape 110 having a 12-mm tape width and a transparent tape color, and a blue ink ribbon 106. For the bottom label LC, the CPU 11 generates cartridge type information indicating the cartridge C since the cartridge C is provided with a print label tape 110 having a 12-mm tape width and a white tape color, and a black ink ribbon 106. The process of S20 is an example of the (b) generating of the present disclosure.

In S25 the CPU 11 sets a layering order for all print labels L edited in S5 indicating the order in which the print labels L are to be bonded together. In the above example, the layering order for the labels LA through LC is set to the order of the bottom label LC, the middle label LB, and the top label LA from bottom to top. The process of S25 is an example of the (c) setting of the present disclosure. In S27 the CPU 11 determines the recommended creation order for all print labels L having the layering order set in S25. In the above example, the temporal creation order is set to the order: top label LA→middle label LB→bottom label LC. The process of S27 is an example of the (e) determining of the present disclosure.

Figure 11B:
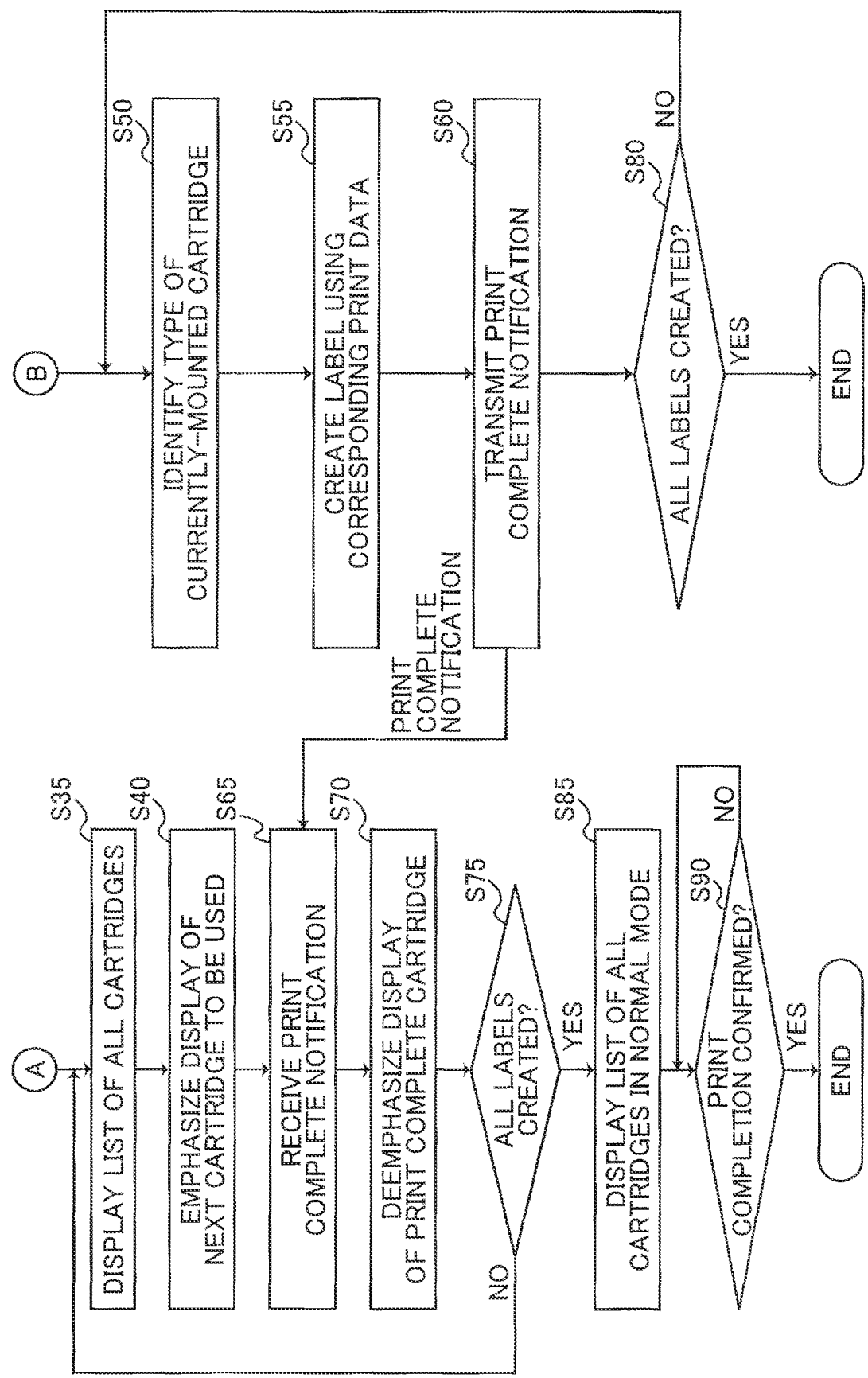

In S30 of FIG. 11B, the CPU 11 transmits all print data generated in S10 to the label printer 3. Hence, in this example the CPU 11 transmits print data for the top label LA, print data for the middle label LB, and print data for the bottom label LC. The process of S30 is an example of the (k) outputting of the present disclosure. Here, the corresponding cartridge type information generated in S20 may be attached to or associated separately with the print data being transmitted at this time. Thus, the cartridge A is associated with print data for the top label LA, the cartridge B with print data for the middle label LB, and the cartridge C with print data for the bottom label LC.

In S35 the CPU 11 displays a list on the display unit 14 that includes the cartridge type information generated in S20 for all cartridges. In this example, the list includes the names cartridges A, B, and C arranged in the order matching the layering order set in S25. The cartridge type information displayed in the list is not limited to the names of the cartridges 101 but may be any information that can identify the types of cartridges, such as the product name, model number, or serial number. The process of S35 is an example of the (d) displaying of the present disclosure. In S40 the CPU 11 performs the emphasizing process described above on the name of the next cartridge to be used in the printing order. Here, the printing order is the recommended creation order determined in S27. The process of S40 is an example of the (f) emphasizing of the present disclosure.

In the current example, step S40 is being performed for the first time after advancing from S30. Therefore, the top label LA is to be printed using cartridge A, which is the first cartridge in the creation order. Accordingly, the CPU 11 performs the emphasizing process to display the name of the cartridge A differently from the names of the other cartridges B and C. In this case, the top label LA is an example of the first label and the specific print label of the present disclosure. After returning to S35 from S75 described later, the CPU 11 will perform the emphasizing process in S40 to emphasize the name of the cartridge B since the middle label LB is to be printed second in order using the cartridge B. In this case, the middle label LB is an example of the second label and the specific print label of the present disclosure.

In the meantime, in S45 of FIG. 11A, the CPU 21c of the label printer 3 receives all print data transmitted in S30 by the operation terminal 2 via the communication control unit 23. In S50 of FIG. 11B, the CPU 21c identifies the type of cartridge 101 currently mounted in the cartridge holder 22 based on detection results by the cartridge sensor 31.

In S55 the CPU 21c creates a print label L using print data received in S45 that is associated with cartridge type information matching the type of the cartridge 101 identified in S50. According to the current example, the CPU 21c creates the label LA, LB, or LC that corresponds to the cartridge A, B, or C mounted in the cartridge holder 22. After creating the print label L, in S60 the CPU 21c transmits a corresponding print complete notification to the operation terminal 2.

In the meantime, after completing the emphasizing process in S40 described above, in S65 the CPU 11 receives a print complete notification transmitted from the label printer 3 in S60, and advances to S70. The process of S65 is an example of the (1) receiving of the present disclosure. In S70 the CPU 11 performs the deemphasizing process described above on the name of the cartridge 101 corresponding to the print label L that has just been printed, as identified by the print complete notification received above. The process of S70 is an example of the (g) deemphasizing of the present disclosure. If printing has been completed for the top label LA using the cartridge A, which is the initial cartridge in the creation order described above, the CPU 11 performs the deemphasizing process on the name of the cartridge A.

In S75 the CPU 11 determines whether all targeted print labels L have been created. Here, the targeted print labels L indicates print labels L to be created. If there remain any print labels L to be created (S75: NO), the CPU 11 returns to S35 and repeats the process described above. In the meantime, after transmitting the print complete notification in S60 described above, the CPU 21c of the label printer 3 also determines in S80 whether all targeted print labels L have been created. If there remain print labels L to be created (S80: NO), the CPU 21c returns to S50 and repeats the process described above.

Each time the above process is repeated, the operation terminal 2 performs the emphasizing process to emphasize the name of the cartridge 101 on the display related to the next print label L being printed and, after the print label L has been printed, performs the deemphasizing process on the display for the same cartridge 101. Thus, using the above example, the above procedure is repeated as follows: emphasize cartridge A→create top label LA→deemphasize cartridge A→emphasize cartridge B→create middle label LB→deemphasize cartridge B→emphasize cartridge C→create bottom label LC→deemphasize cartridge C.

Note that the cartridge 101 on which the emphasizing process is performed in S40 is identified in accordance with the recommended creation order determined in S27. That is, the CPU 11 of the operation terminal 2 performs the emphasizing process to emphasize the name of the cartridge 101 for the print label L corresponding to the earliest creation (printing) order among the print labels L that have not yet been printed.

Once a print complete notification has been received for all targeted print labels L being created (S75: YES), in S85 the CPU 11 uniformly displays the list of names for all cartridges 101 related to all print labels L being created in their normal mode, i.e., cancels all emphasizing processes performed in S35 and all deemphasizing process performed in S70. FIG. 10 illustrates an example of the display unit 14 at this time. In the example of FIG. 10, this list is displayed in S85 together with the layering order described above.

In S90 the CPU 11 confirms whether all targeted print labels L have been printed through a suitable user operation on the operating unit 13. In the present embodiment, the user operates the "OK" button (see FIG. 10) to input confirmation. If the user confirms that all print labels L have been printed (S90: YES), the CPU 11 ends the sequence of FIGS. 11A and 11B.

In the meantime, while the label printer 3 repeats the process described above, each time the cartridge 101 is mounted in the cartridge holder 22, the type of the mounted cartridge 101 is identified, and the label printer 3 creates the corresponding print label using the print data received in S45 together with the cartridge type information that matches the identified type of the mounted cartridge. Thus, when the cartridge A is mounted, the label printer 3 creates the top label LA and transmits a print complete notification.

When the cartridge B is mounted, the label printer 3 creates the middle label LB and transmits a print complete notification. When the cartridge C is mounted, the label printer 3 creates the bottom label LC and transmits a print complete notification. After the label printer 3 has completed printing of all targeted print labels L and has transmitted their print complete notifications (S80: YES), the label printer 3 ends the sequence in FIGS. 11A and 11B.

<Effects of the Embodiment>

In the present embodiment described above, the CPU 11 executes the process of S20 to generate cartridge type information corresponding to each of the print labels L targeted for creation. In S25 the CPU 11 sets a layering order for bonding together the plurality of print labels L. In S35 the CPU 11 displays a list of the cartridge type information generated above on the display unit 13 in an order conforming to the layering order set the above.

By confirming the cartridge type information arranged in the same order that the print labels L will be bonded together, the user can easily and visually identify the order that each cartridge 101 should be inserted into the label printer 3.

In S40, which is a particular feature of the present embodiment, the CPU 11 performs an emphasizing process to emphasize the display of cartridge type information for the next print label L in the printing order relative to the displays of other cartridge type information. In this way, the user can see at a glance which cartridge 101 is needed for printing the next print label L in the printing order.

Another feature of the present embodiment is that the next time the CPU 11 executes S40 after printing of the first top label LA is completed, the CPU 11 performs the emphasizing process on the display for the cartridge B, which is to be used next for printing the middle label LB. Accordingly, the user can see at a glance which cartridge 101 is needed for the middle label LB that is printed second.

Another feature of the present embodiment is that in S70 the CPU 11 performs a deemphasizing process on the display of the cartridge 101 pertaining to the print label L that has just been printed. Accordingly, the user can see at a glance which cartridges 101 have already been used to print their corresponding print labels L.

That is, after printing of the top label LA created first has been completed as described above, the CPU 11 performs the deemphasizing process on the display for the cartridge A pertaining to the top label LA. Accordingly, the user can see at a glance which cartridge 101 has already been used for printing the first top label LA.

While the description has been made in detail with reference to a specific embodiment, it would be apparent to those skilled in the art that many modifications and variations may be made thereto, without departing from the spirit and technical ideas of the disclosure. Below, some of these variations will be described in detail, wherein like parts and components are designated with the same reference numerals to avoid duplicating description.

(1) Displaying the List in Normal Mode Prior to Transmitting Print Data

After setting the layering order in S25 of the embodiment described above, in S30 the CPU 11 transmits all print data directly to the label printer 3, and in S35 and S40 emphasizes the next cartridge in sequence in the displayed list. However, the present disclosure is not limited to this method.

For example, the CPU 11 may execute S35 after setting the layering order in S25 to display the list of cartridge type information for all cartridges in an order conforming with the layering order. In this case, the CPU 11 may subsequently perform a new step to determine whether the user has inputted confirmation of the displayed list. If the user has inputted "OK", the CPU 11 reaches a YES determination, transmits the print data in S30, and performs the emphasizing process in S40 to emphasize the first cartridge in the list already displayed on the display unit 14. This variation can obtain the same effects described in the embodiment.

(2) Acquiring the Type of the Mounted Cartridge in Advance

A control procedure executed cooperatively by the CPU 11 of the operation terminal 2 and the CPU 21c of the label printer 3 according to the present variation will be described with reference to FIGS. 12A and 12B, which corresponds to FIGS. 11A and 11B in the embodiment. As in the embodiment described above, the CPU 11 executes the control procedure based on a printing program stored in the ROM 12b, and the CPU 21c executes the control procedure based on a suitable control program stored in the ROM 21a. By executing this procedure, the CPU 11 and CPU 21c implement the following printing method according to the present variation.

Figure 12A:
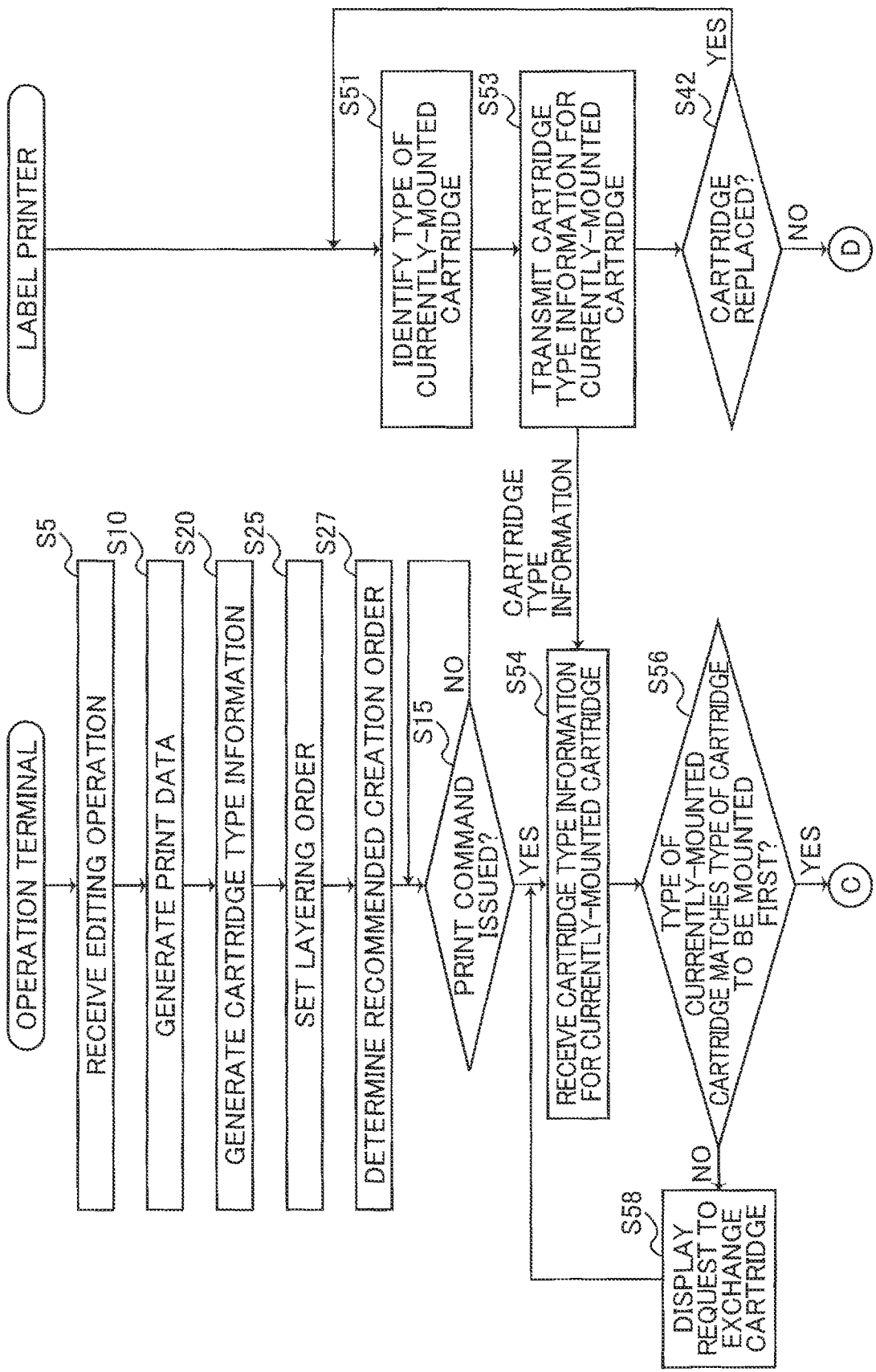
FIGS. 12A and 12B are sequence charts illustrating steps in a control procedure executed cooperatively by the CPU of the operation terminal and the CPU of the label printer according to one variation of the embodiment in which a type of a cartridge mounted in the label printer is acquired in advance.
Figure 12B:
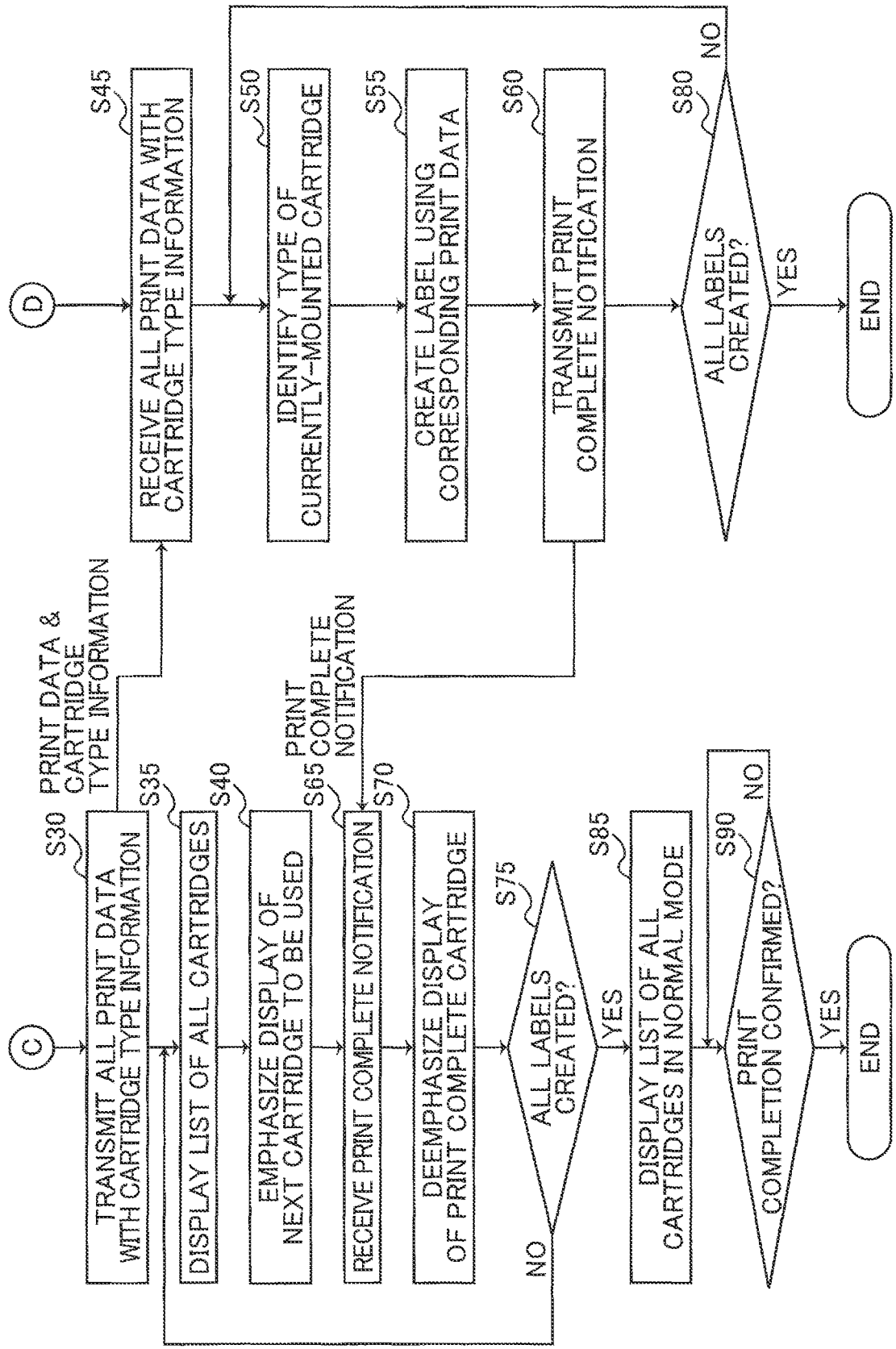

In the sequence of FIGS. 12A and 12B, the CPU 11 of the operation terminal 2 performs steps S5 and S10 described in the embodiment. However, rather than executing step S15 as in the embodiment, in this variation the CPU 11 generates cartridge information for each cartridge 101 in S20, sets the layering order in S25, and determines a recommended creation order in S27. Subsequently, the CPU 11 advances to S15 described in the embodiment to determine whether the user has issued a print command instructing the creation of the labels LA through LC. The process of S15 is an example of the (i) receiving of the present disclosure. If a print command has been issued (S15: YES), the CPU 11 advances to S54 described later.

In the meantime, the CPU 21c of the label printer 3 executes the new steps S51 and S53 of FIG. 12A. In S51 the CPU 21c identifies the type of the cartridge 101 currently mounted in the cartridge holder 22 according to the same method described in S50 of FIG. 11B. In S53 the CPU 21c transmits cartridge type information for the identified cartridge 101 to the operation terminal 2. In S54 the CPU 11 of the operation terminal 2 receives the cartridge type information transmitted in S53 by the label printer 3 and advances to the new step S56. The process of S54 is an example of the (h) acquiring of the present disclosure.

Using the cartridge type information received in S54, the CPU 11 determines in S56 whether the cartridge 101 currently mounted in the label printer 3 matches the type of the cartridge 101 associated with the print label L to be created first according to the creation order set in S27. The print label L to be created first is an example of the initial print label of the present disclosure, and the cartridge type information representing the type of cartridge 101 associated with this print label L is an example of the initial medium type information of the present disclosure. Further, the process of S56 is an example of the (j) determining of the present disclosure. The CPU 11 advances to S30 when determining that the cartridge 101 currently mounted in the label printer 3 matches the type of cartridge 101 associated with the print label L to be created first (S56: YES).

However, if the cartridge 101 currently mounted in the label printer 3 does not match the type of cartridge 101 associated with the print label L to be created first (S56: NO), in S58 the CPU 11 displays a prescribed message on the display unit 14 requesting the user to exchange the cartridge 101. When the user exchanges the cartridge 101 mounted in the cartridge holder 22 in response to this display, the CPU 21c of the label printer 3 after completing step S53 determines in S42 that the cartridge 101 has been replaced (S42: YES) and returns to S51 to identify the newly mounted cartridge. In S53 the CPU 21c transmits cartridge type information for the identified cartridge to the operation terminal 2 based on the identification results in S51, and the CPU 11 receives this cartridge type information in S54. If the CPU 11 determines in S56 that this cartridge type information matches the type of the cartridge 101 to be mounted first (S56: YES), the CPU 11 advances to S30 described in FIG. 11A of the embodiment. The process from S30 of FIG. 12B, including the content of steps S30 through S40 and S65 through S90 executed by the CPU 11 of the operation terminal 2, is identical to that described in FIGS. 11A and 11B. Therefore, a description of this process will not be repeated.

The cartridge 101 will not be replaced when the type of the cartridge 101 mounted in the cartridge holder 22 matches the type of the cartridge 101 to be mounted first. Further, if the user exchanged cartridges in response to the request displayed in S58 and the type of the newly mounted cartridge 101 matches the type of cartridge 101 to be mounted first, the cartridge 101 will not be replaced again. In either case, the CPU 21c determines in S42 that the cartridge 101 has not been replaced (S42: NO) and advances to S45 described in FIG. 11A of the embodiment. The process from S45, including the content of steps S45 through S60 and S80 executed by the CPU 21c of the label printer 3, are identical to the processes in FIGS. 11A and 11B. Hence, a description of these processes will not be repeated.

<Effects of the Variation>

The present variation obtains the same effects described in the embodiment described above.

Another feature of the present variation is that in S54 the CPU 11 acquires cartridge type information for the cartridge 101 actually mounted in the label printer 3. The CPU 11 compares the cartridge type information associated with the print label L to be printed first (the top label LA in this example) with the cartridge type information acquired in S54 and determines in S56 whether the two are compatible. When compatible, in S30 the CPU 11 outputs print data to the label printer 3 for printing the labels LA through LC. This method can prevent creation of a print label L from being initiated while the wrong cartridge 101 is mounted in the cartridge holder 22 of the label printer 3 due to the user's misunderstanding or another reason.

(3) Acquiring the Type of the Mounted Cartridge Each Time the Cartridge is Mounted The above variation (2) describes a case in which the type of the cartridge 101 mounted in the label printer 3 is acquired and is determined whether to match the type of the cartridge 101 associated with the print label L to be created first prior to the creation of all targeted print labels L. However, the present disclosure is not limited to this configuration. The acquisition and determination of the type of the mounted cartridge 101 may be performed prior to the creation of each print label L. This type of variation will be described with reference to FIGS. 13A and 13B.

Figure 13A:
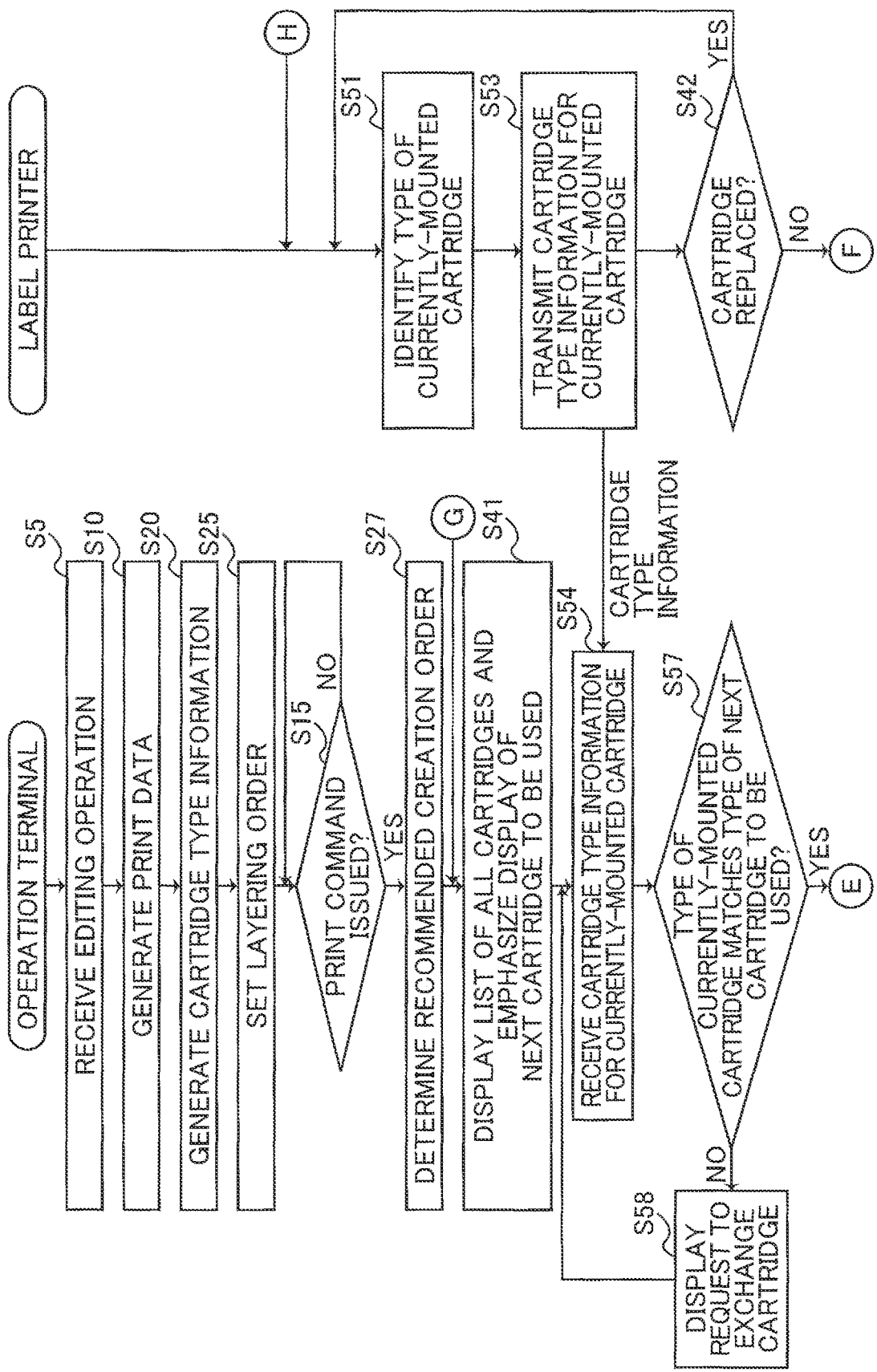

In the sequence of FIGS. 13A and 13B, the CPU 11 of the operation terminal 2 performs steps S5 through S25 as in the above variation (2) illustrated in FIGS. 12A and 12B. However, rather than executing step S27 as in FIG. 12A, in this variation the CPU 11 waits for issuance of a print command in S15, and if a print command is issued (S15: YES), the CPU 11 advances to S27 to determine a recommended creation order for creating the print labels L. In this variation, the recommended creation order is determined to the order: bottom label LC→middle label LB→top label LA.

Subsequently, in S41 the CPU 11 displays the list of the names of the cartridges A, B, and C in accordance with the layering order set in S25, and performs the emphasizing process to emphasize the name of the cartridge related to the next print label L being printed in accordance with the recommended creation order determined in S27. In this variation, the CPU 11 emphasizes the name of the cartridge C first, the name of the cartridge B second, and the name of the cartridge A third.

In the meantime, in S51 the CPU 21c of the label printer 3 identifies the type of the cartridge 101 currently mounted in the cartridge holder 22, and in S53 the CPU 21c transmits cartridge type information for the identified cartridge 101 to the operation terminal 2. In S54 the CPU 11 of the operation terminal 2 receives the cartridge type information transmitted in S53 by the label printer 3 and advances to the new step S57.

Using the cartridge type information received in S54, the CPU 11 determines in S57 whether the cartridge 101 currently mounted in the label printer 3 matches the type of the cartridge 101 associated with the print label L to be created next according to the creation order determined in S27. The CPU 11 advances to S31 when determining that the cartridge 101 currently mounted in the label printer 3 matches the type of cartridge 101 associated with the print label L to be created next (S57: YES). If the cartridge 101 currently mounted in the label printer 3 does not match the type of cartridge 101 associates with the print label L to be crated next (S57: NO), in S58 the CPU 11 displays the prescribed message on the display unit 14 requesting the user to exchange the cartridge 101, as in the above variation illustrated in FIGS. 11A and 11B. The process performed by the CPU 21c of the label printer 3 after the user exchanges the cartridge 101 mounted in the cartridge holder 22 in response to this display is identical to that described in FIGS. 11A and 11B.

When the CPU 11 of the operation terminal 2 receives the cartridge type information in S54 again and determines in S56 that this cartridge type information matches the type of the cartridge 101 to be mounted next (S57: YES), the CPU 11 advances to S31 in FIG. 13B. In S31 the CPU 11 transmits print data for the print label L to be created next to the label printer 3. In this variation the CPU 11 transmits print data for the bottom label LC first, transmits print data for the middle label LB second, and transmits print data for the top label LA third. All print data is generated in S10.

In the meantime, in S46 of FIG. 13B, the CPU 21c of the label printer 3 receives print data for the print label L to be created next via the communication control unit 23. In S57 the CPU 21c creates the print label L based on the received print data, and in S60 the CPU 21c transmits a print complete notification to the operation terminal 2.

After transmitting the print data in S31 described above, in S65 the CPU 11 of the operation terminal 2 receives a print complete notification transmitted from the label printer 3 in S60. In S71 the CPU 11 displays the list of the names of the cartridges A, B, and C in accordance with the layering order set in S25, and performs the deemphasizing process to deemphasize the name of the cartridge corresponding to the print labels L that have been printed, as identified by each print complete notification received in S65. If printing has been completed for the bottom label LC using the cartridge C, the CPU 11 performs the deemphasizing process on the name of the cartridge C. If printing has been completed for the bottom label LC and middle label LB using the cartridge C and cartridge B respectively, the CPU 11 performs the deemphasizing process on both the name of the cartridges C and B.

In S75 the CPU 11 determines whether all targeted print labels L have been created. If there remain any print labels L to be created (S75: NO) the CPU 11 returns to S41 and repeats the process described above. In the meantime, after transmitting the print complete notification, the CPU 21c of the label printer 3 determines in S81 whether all targeted print labels L have been created. If there remain any print label L to be created (S81: NO), the CPU 21c returns to S51 and repeats the process described above.

Each time the above process is repeated, the operation terminal 2 determines whether the type of the cartridge 101 currently mounted in the label printer 3 matches the type of cartridge 101 associated with the print label L to be created next according to the determined creation order. Once a print complete notification has been received for all targeted print labels L being crated (S75: YES), the CPU 11 of the operation terminal 2 performs the process of S85 and S90 as in the variation illustrated in FIGS. 12A and 12B.

The present variation obtains the same effects described in the above variation.

Another feature of the present variation is that in S54 the CPU 11 acquires cartridge type information for the cartridge 101 actually mounted in the label printer 3 each time the cartridge 101 is mounted, and compares the cartridge type information associated with the print label L to be printed next with the cartridge type information acquired in S54. When the cartridge type information for the next print label L to be created matches the cartridge type information acquired in S54, in S31 the CPU 11 outputs print data to the label printer 3 for printing the next print label L to be created. This method can prevent each print label L to be used for creating a composite label LL from being created while the wrong cartridge 101 is mounted in the cartridge holder 22 of the label printer 3.

(4) Standalone Label Printer

The present embodiment describes a case in which the method of creating a plurality of print labels L is achieved through cooperation of the operation terminal 2 and label printer 3, but the present disclosure is not limited to this configuration. A plurality of print labels L may be created on the label printer 3 alone without use of the operation terminal 2. That is, the functions of the operating unit 13 and display unit 14 in the operation terminal 2 may be implemented by an operating unit (not illustrated) provided in the label printer 3, and the display unit 32, and steps in the control procedure performed by the CPU 11 may be executed by the CPU 21c instead. This type of variation will be described with reference to the flowchart in FIG. 14. Steps in FIG. 14 that are similar to those in FIGS. 11A and 11B are designated with the same step numbers, and a "'" is appended to step numbers in FIG. 14 that are executed by the CPU 11 of the of the operation terminal 2 in FIGS. 11A and 11B.

Figure 14:
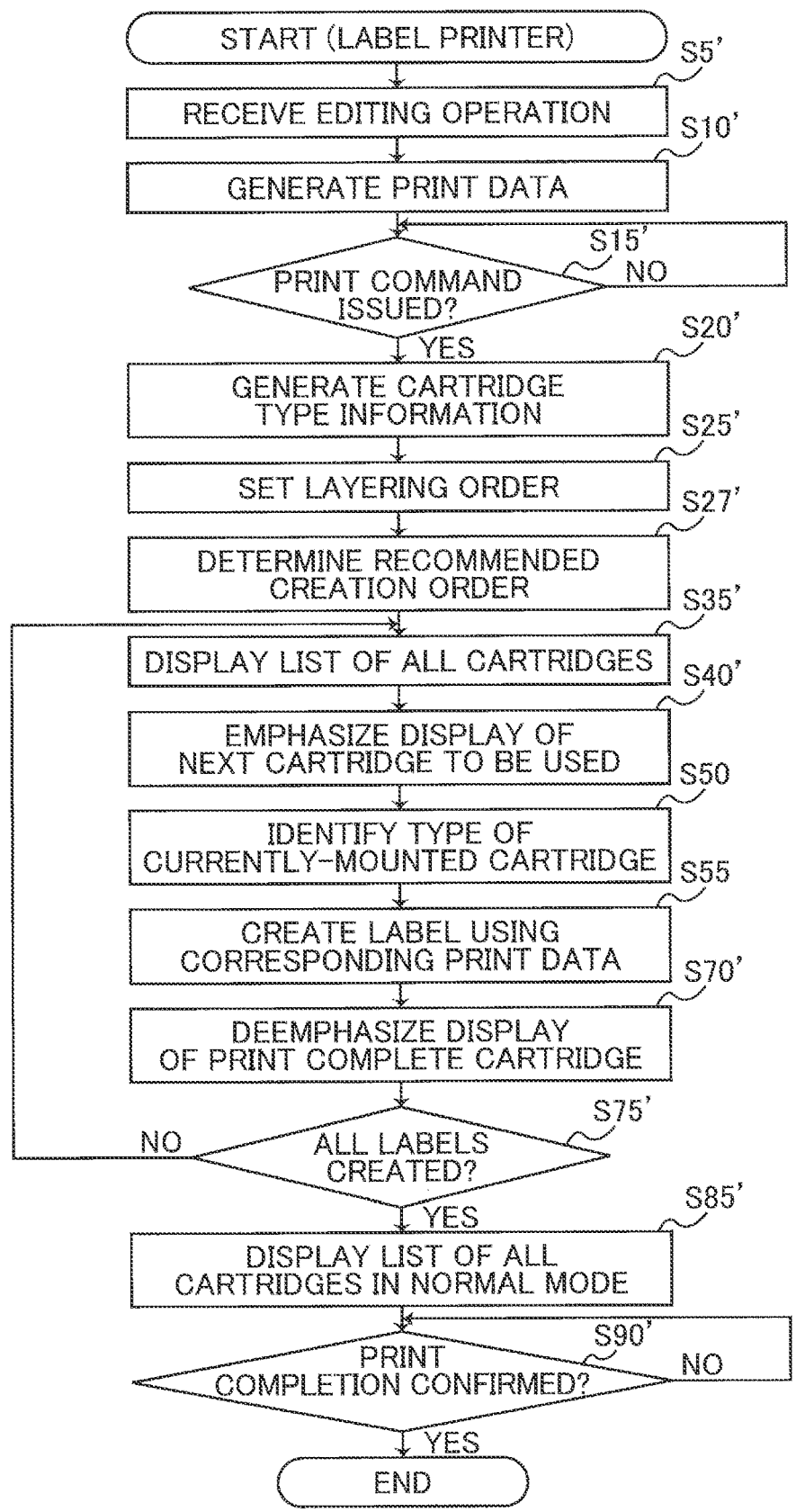
FIG. 14 is a flowchart illustrating steps in a control procedure executed by a CPU of a standalone label printer according to still another variation of the embodiment of the present disclosure.

At the beginning of FIG. 14, the CPU 21c of the label printer 3 executes S5' through S40' that are equivalent to S5 through S40 executed by the CPU 11 of the operation terminal 2 in FIGS. 11A and 11B.

Specifically, the CPU 21c receives editing content in S5' and generates corresponding print data in S10'. When the CPU 21c determines that a print command has been issued via the operating unit described above (S15': YES), in S20' the CPU 21c generates cartridge type information for each cartridge 101 associated with each set of print data. Note that the process of S20' is an example of the (b) generating of the present disclosure. Next, the CPU 21c determines the layering order of cartridges 101 in S25' and sets the recommended creation order of print labels L in S27'. The process of S25' is an example of the (c) setting of the present disclosure. The process of S27' is an example of the (e) determining of the present disclosure. In S35' the CPU 21c displays a list on the display unit 32 that includes the names of all cartridges 101, and in S40' performs an emphasizing process to emphasize the display of the cartridge 101 that should be used next in order. The process of S35' is an example of the (f) emphasizing of the present disclosure.

After completing the process in S40', the CPU 21c executes the same processes in S50 and S55 described in FIG. 11B. That is, in S50 the CPU 21c identifies the type of the mounted cartridge 101 based on detection results from the cartridge sensor 31, and in S55 creates a print label L using the corresponding print data. The process of S50 is an example of the (h) detecting of the present disclosure. The process of S55 is an example of the (a) controlling of the present disclosure.

In S70' the CPU 21c performs the deemphasizing process on the name of the cartridge 101 corresponding to the print label L that has just been printed. The process of S70' is an example of the (g) deemphasizing of the present disclosure. In S75' the CPU 21c determines whether all targeted print labels L have been created. If there remain any print labels L to be created (S75': NO), the CPU 21c returns to S35' and repeats the process described above. Once printing has been completed for all print labels L (S75': YES), in S85' the CPU 21c uniformly displays the list of names for all cartridges 101 pertaining to all targeted print labels L in their normal mode, i.e., canceling all emphasizing processes performed in S35' and all deemphasizing processes performed in S70'.

In S90' the CPU 21c confirms whether all targeted print labels L have been printed by prompting the user to perform an operation on the operating unit. If the user confirms all print labels L have been printed (S90': YES), the CPU 21c ends the sequence of FIG. 13.

The present variation obtains the same effects described in the embodiment described above.

Specifically, the CPU 21c executes the process in S20' of FIG. 14 in the present variation to generate cartridge type information corresponding to each of the print labels L targeted for creation. In S25' the CPU 21c sets a layering order for bonding together the plurality of print labels L. In S35' the CPU 21c displays a list of the cartridge type information generated above on the display unit 14 in an order conforming to the layering order set above.

Accordingly, by confirming the cartridge type information arranged in the display on the display unit 32 in the same order as the print labels L being bonded together, the user can easily and visually identify the order that each cartridge 101 should be inserted into (mounted in) the label printer 3.

Further, the CPU 21c of the label printer 3 may also implement a process similar to that in variation (2) described above by executing the steps illustrated in FIGS. 12A and 12B that are executed by the CPU 11 in variation (2). That is, the CPU 21c may perform a step similar to S56 in order to determine whether the type of the cartridge previously identified is a cartridge associated with the print label L to be created first and may perform a label print in S55 when the mounted cartridge matches the type corresponding to the targeted print label L being created. Note that in this case, the print label L to be created first described above is also an example of the initial print label of the present disclosure, and the cartridge type information corresponding to this print label L is also an example of the initial medium type information of the present disclosure. Further, the process executed in S15' is an example of the (i) receiving of the present disclosure, and the process executed in S53 and S54 is an example of the (h) detecting of the present disclosure. Furthermore, the process performed similarly to S56 is an example of the (j) determining of the present disclosure.

(5) Automatic Power-Off

A function on the label printer 3 known as automatic power-off may be implemented while creating a plurality of print labels L as described above. Specifically, if a prescribed time elapses after printing one print label L without the cartridge 101 needed for printing the next print label L in sequence being mounted in the cartridge holder 22, the device power supply is turned off. This process executed by the CPU 21c is an example of the (k) turning of the present disclosure. Thus, if one of the corresponding cartridges 101 cannot be found while creating the plurality of print labels L, creating of the print labels L can be interrupted.

Further, when the power supply is turned off after the prescribed time has elapsed since the completion of printing, as described above, data related to the unprinted print labels L may be stored in a desired memory, such as the RAM of the label printer 3. That is, print data for the unprinted print labels L and the corresponding cartridge type information may be stored in memory. In this case, the memory such as the RAM described above is an example of the memory of the present disclosure, and the process executed by the CPU 21c in this situation is an example of the (1) storing of the present disclosure.

In addition to the above situation, the user may intentionally switch off the power supply after printing one print label L while creating a plurality of print labels L. In this case as well, print data related to the unprinted print labels L and the corresponding cartridge type information may be stored in the RAM of the label printer 3 or the like.

As a variation, print data and cartridge type information related to unprinted print labels L are stored in the RAM when the power supply for the label printer 3 is automatically turned off as described above or when creation of a plurality of print labels L is interrupted by the user intentionally switching off the power supply. By storing data for unprinted print labels L when creation of a plurality of print labels L is interrupted, the label printer 3 can resume creation of only those unprinted print labels L the next time the power supply is turned on, rather than starting over from the beginning. In other words, this method can prevent the label printer 3 from re-creating print labels L that have already been created. Further, by interrupting the creation of a plurality of print labels L, as described above, the user can create other print labels L separate from these plurality of print labels L before completing creation of the first print labels L.

(6) Other Variations

The embodiment and its variations describe a laminating method in which printing is performed on a cover film 104 separate from the base tape 102, and the cover film 104 and base tape 102 are bonded together. However, the present disclosure may be applied to a method of printing on a print tape layer provided in the base tape (a non-laminating type).

Further, the flowcharts illustrated in FIGS. 11A, 11B, 12A, 12B, 13A, 13B and 14 do not limit the present disclosure to the steps indicated therein. Steps may be added or deleted, or their order may be rearranged, without departing from the spirit and technical ideas of the disclosure.

In addition to what has already been described, the methods according to the embodiment and its variations described above may be used in suitable combinations.

In addition, although not illustrated individually, the present disclosure may be implemented with various modifications.

What is claimed is:

1. A non-transitory computer-readable storage medium storing a set of program instructions installed on and executed by a controller provided in a terminal device configured to communicate with a printing device, the set of program instructions comprising:
   (a) generating a set of print data comprising first print data and second print data,
   the first print data corresponding to a first print label,
   the second print data corresponding to a second print label,
   the first print label and the second print label being to be used in an overlaid state;
   (b) generating a set of medium type information comprising first medium type information and second medium type information,
   the first medium type information indicating a type of a printing medium used for creating the first print label,
   the second medium type information indicating a type of a printing medium used for creating the second print label; and
   (c) displaying a list of the set of medium type information on a display.

2. The non-transitory computer-readable storage medium according to claim 1, wherein the set of program instructions further comprises:
   (d) determining a printing order for the first print label and the second print label,
   the printing order indicating an order in which printing of the first print label and printing of the second print label are performed with the printing device; and
   (e) emphasizing, in the list displayed on the display, specific medium type information over remaining of the set of medium type information,
   the specific medium type information corresponding to a specific print label, printing of the specific print label being to be performed next.

3. The non-transitory computer-readable storage medium according to claim 2,
   wherein in a case where the printing of the second print label is performed immediately after the printing of the first print label is performed, the (e) emphasizing emphasizes the second medium type information more than the first medium type information when the printing of the first print label is completed.

4. The non-transitory computer-readable storage medium according to claim 1,
   wherein the set of program instructions further comprises:
   (f) deemphasizing, in the list displayed on the display, printed medium type information over remaining of the set of medium type information,
   the printed medium type information corresponding to a printed print label, printing of the printed print label having been completed.

5. The non-transitory computer-readable storage medium according to claim 4,
   wherein, in a case where printing of the second print label is performed immediately after printing of the first print label is performed, the (f) deemphasizing deemphasizes the first medium type information more than the second medium type information when the printing of the first print label is completed.

6. The non-transitory computer-readable storage medium according to claim 4,
   wherein the set of program instructions further comprises:
   (k) receiving a print complete notification for each of the first print label and the second print label from the printing device, the print complete notification indicating that printing of the each of the first print label and the second print label has been completed, and
   wherein the (f) deemphasizing deemphasizes medium type information corresponding to the print complete notification received in the (k) receiving.

7. The non-transitory computer-readable storage medium according to claim 1,
   wherein the terminal device includes: an operation interface; and a communication interface via which the terminal device is communicable with the printing device, and
   wherein the set of program instructions further comprises:
   (g) acquiring mounted medium type information from the printing device via the communication interface,
   the mounted medium type information indicating a type of the printing medium accommodated in a mounted medium accommodation body currently mounted in a mounting portion of the printing device;
   (h) receiving a print command for a set of print labels including the first print label and the second print label via the operation interface;
   (i) determining, in response to receiving the print command, whether initial medium type information matches the mounted medium type information, the initial medium type information corresponding to an initial print label, printing of the initial print label being to be performed first among the set of print labels; and
   (j) outputting, in response to determining that the initial medium type information matches the mounted medium type information, the set of print data to the printing device, the printing device performing printing of the set of print labels based on respective ones of the set of print data.

8. The non-transitory computer-readable storage medium according to claim 1,
   wherein the (c) displaying displays the list of the set of medium type information on the display after printing of all of a set of print labels including the first print label and the second print label is completed.

9. A printing device comprising:
   a mounting portion in which a medium accommodation body is detachably mountable, the medium accommodation body accommodating therein and being capable of supplying a printing medium;
   a printing portion configured to perform desired printing using the printing medium supplied from the medium accommodation body;
   a display; and
   a controller configured to perform:
   (a) controlling the printing portion to perform printing of a first print label based on first print data and printing of a second print label based on second print data,
   the first print label and the second print label being to be used in an overlaid state;
   (b) generating a set of medium type information comprising first medium type information for the first print label and second medium type information for the second print label, the first medium type information indicating a type of the printing medium accommodated in the medium accommodation body used for creating the first print label, the second medium type information indicating a type of the printing medium accommodated in the medium accommodation body used for creating the second print label; and (c) displaying a list of the set of medium type information on the display.

10. The printing device according to claim 9, wherein the controller is configured to further perform:

(d) determining a printing order for the first print label and the second print label, the printing order indicating an order in which the printing of the first print label and the printing of the second print label are performed; and (e) emphasizing, in the list displayed on the display, specific medium type information over remaining of the set of medium type information, the specific medium type information corresponding to a specific print label, printing of the specific print label being to be performed next.

11. The printing device according to claim 10, wherein, in a case where the printing of the second print label is performed immediately after the printing of the first print label is performed, the (e) emphasizing emphasizes the second medium type information more than the first medium type information when the printing of the first print label is completed.

12. The printing device according to claim 9, wherein the controller is configured to further perform:

(f) deemphasizing, in the list displayed on the display, printed medium type information over remaining of the set of medium type information, the printed medium type information corresponding to a printed print label, printing of the printed print label having been completed.

13. The printing device according to claim 12, wherein, in a case where the printing of the second print label is performed immediately after the printing of the first print label is performed, the (f) deemphasizing deemphasizes the first medium type information more than the second medium type information when the printing of the first print label is completed.

14. The printing device according to claim 9, further comprising:

an operation interface, wherein the controller is configured to further perform:

(g) detecting a type of the printing medium accommodated in the medium accommodation body currently mounted in the mounting portion;

(h) receiving a print command for a set of print labels including the first print label and the second print label via the operation interface; and (i) determining, in response to receiving the print command, whether a type of the printing medium indicated by initial medium type information matches the detected type of the printing medium detected in (g), the initial medium type information corresponding to an initial print label, printing of the initial print label being to be performed first among the set of print labels, and wherein the (a) controlling is performed in response to determining in (i) that the type of the printing medium indicated by the initial medium type information matches the detected type of the printing medium detected in (g).

15. The printing device according to claim 9, wherein the controller is configured to further perform:

(j) turning off device power supply when a prescribed time elapses after printing of one print label is completed without a next medium accommodation body being mounted in the mounting portion, the next medium accommodation body being used for printing of a next print label, the printing of the next print label being performed immediately after the printing of the one print label is performed.

16. The printing device according to claim 9, further comprising:

a memory, wherein the controller is configured to further perform:

(k) storing unprinted print data and unprinted medium type information in the memory when device power supply is to be turned off prior to completion of printing of all of a set of print labels including the first print label and the second print label, both of the unprinted print data and the unprinted medium type information corresponding to an unprinted print label, printing of the unprinted print label having not been completed.

17. A method for creating a first print label and a second print label with a printing device, the method comprising:

(a) generating first print data corresponding to the first print label;

(b) generating second print data corresponding to the second print label;

(c) acquiring first medium type information corresponding to the first print data, the first medium type information indicating a type of a first printing medium used for creating the first print label;

(d) acquiring second medium type information corresponding to the second print data, the second medium type information indicating a type of a second printing medium used for creating the second print label; and (e) displaying first display information related to the first medium type information and second display information related to the second medium type information on a display.

18. The method according to claim 17, wherein the (e) displaying is performed after the first print label and the second print label are created with the printing device.

19. The method according to claim 17, wherein the (e) displaying is performed prior to creation of each of the first print label and the second print label with the printing device.

* * * * *